United States Patent
Maeda et al.

(10) Patent No.: US 9,871,643 B2
(45) Date of Patent: Jan. 16, 2018

(54) MOBILE COMMUNICATION SYSTEM

(75) Inventors: Miho Maeda, Tokyo (JP); Mitsuru Mochizuki, Tokyo (JP); Yasushi Iwane, Tokyo (JP); Yuji Kakehi, Tokyo (JP); Masayuki Nakazawa, Tokyo (JP); Taisei Suemitsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 321 days.

(21) Appl. No.: 13/577,522

(22) PCT Filed: Feb. 9, 2011

(86) PCT No.: PCT/JP2011/052720
§ 371 (c)(1),
(2), (4) Date: Aug. 7, 2012

(87) PCT Pub. No.: WO2011/099508
PCT Pub. Date: Aug. 18, 2011

(65) Prior Publication Data
US 2012/0307715 A1  Dec. 6, 2012

(30) Foreign Application Priority Data
Feb. 12, 2010 (JP) .................. 2010-028412

(51) Int. Cl.
*H04W 72/04* (2009.01)
*H04B 7/14* (2006.01)
(Continued)

(52) U.S. Cl.
CPC ....... *H04L 5/0062* (2013.01); *H04B 7/15507* (2013.01); *H04L 5/001* (2013.01);
(Continued)

(58) Field of Classification Search
CPC ...... H04W 48/02; H04W 60/00; H04W 72/04
(Continued)

(56) References Cited

U.S. PATENT DOCUMENTS 8,744,342 B2   6/2014  Brunel et al.
8,824,355 B2   9/2014  Takano
(Continued)

FOREIGN PATENT DOCUMENTS

CN   101637049 A   1/2010
JP   2002-252587   9/2002
(Continued)

OTHER PUBLICATIONS

Jeju, Relay Node Access Link with different Carriers, Nov. 9-13, 2009, pp. 1-3, 3GPP TSG-RAN WG1#59 R1-094452.*
(Continued)

*Primary Examiner* — Romani Ohri
(74) *Attorney, Agent, or Firm* — Oblon, McClelland, Maier & Neustadt, L.L.P.

(57) ABSTRACT

A mobile communication system capable of preventing interference in a communication system as well as reducing the load of a user equipment in a search operation. In the mobile communication system, radio communication is performed using a carrier having the same frequency in a direct link between a donor cell and a user equipment being served thereby and an access link between a relay node and a user equipment being served thereby. In a backhaul link between the donor cell and the relay node, radio communication is performed using a carrier having a different frequency from that of the carrier used in the direct link and the access link.

3 Claims, 20 Drawing Sheets

(51) Int. Cl.
*H04L 5/00* (2006.01)
*H04B 7/155* (2006.01)
*H04W 28/06* (2009.01)
*H04W 84/04* (2009.01)

(52) U.S. Cl.
CPC .......... *H04L 5/0073* (2013.01); *H04W 28/06* (2013.01); *H04W 84/047* (2013.01)

(58) Field of Classification Search
USPC ........................................ 370/315, 329, 336
See application file for complete search history.

(56) References Cited

U.S. PATENT DOCUMENTS

| | | | |
|---|---|---|---|
| 9,002,260 B2 | 4/2015 | Martin | |
| 2008/0080436 A1 | 4/2008 | Sandhu et al. | |
| 2008/0108355 A1 | 5/2008 | Oleszcsuk | |
| 2008/0242308 A1* | 10/2008 | Gunnarsson et al. | 455/450 |
| 2009/0131098 A1* | 5/2009 | Khandekar et al. | 455/525 |
| 2010/0034135 A1* | 2/2010 | Kim | H04B 7/2606 370/315 |
| 2010/0142417 A1* | 6/2010 | Kim et al. | 370/281 |
| 2011/0080864 A1* | 4/2011 | Cai | H04W 36/30 370/315 |
| 2011/0117834 A1 | 5/2011 | Martin | |
| 2012/0082087 A1* | 4/2012 | Takano | H04B 7/15557 370/315 |

FOREIGN PATENT DOCUMENTS

| | | |
|---|---|---|
| JP | 2008-118659 A | 5/2008 |
| JP | 2010-501140 | 1/2010 |
| JP | 2011-525772 A | 9/2011 |
| WO | WO 2008/042192 A1 | 4/2008 |
| WO | WO 2008/141355 A1 | 11/2008 |
| WO | WO 2009/150160 A1 | 12/2009 |
| WO | WO 2009/154279 A1 | 12/2009 |
| WO | WO 2010/002100 A2 | 1/2010 |
| WO | WO 2010/013980 A2 | 2/2010 |
| WO | WO 2011/018892 A1 | 2/2011 |

OTHER PUBLICATIONS

International Preliminary Report on Patentability issued Aug. 23, 2012, in PCT/JP2011/052720.
International Preliminary Report on Patentability issued Sep. 27, 2012, in PCT/JP2011/052720.
Written Opinion of the International Searching Authority and International Search Report issued Mar. 15, 2011, in PCT/JP2011/052720 (with English-language translation).
"Evolved Universal Terrestrial Radio Access (E-UTRA) and Evolved Universal Terrestrial Radio Access Network (E-UTRAN)", 3GPP TS 36.300, vol. 9.1.0, Release 9, Sep. 2009, 165 pages.
"Signaling of MBSFN subframe allocation in D-BCH", Nokia Siemens Networks, Nokia, Huawei, 3GPP TSG-RAN WG1 Meeting #491315, R1-072963, Jun. 25-29, 2007, 5 pages.
"Evolved Universal Terrestrial Radio Access (E-UTRA); User Equipment (UE) procedures in idle mode", 3GPP TS 36.304, vol. 9.0.0, Release 9, Sep. 2009, 30 pages.
"LS on HNB/HeNB Open Access Mode", 3GPP TSG-SA1 #42, S1-083461, Oct. 13-17, 2008, 2 pages.
"LS on CSG cell identification", RAN2, 3GPP TSG-RAN WG 2 Meeting #62, R2-082899, May 5-9, 2008, 2 pages.
"Further Advancements for E-UTRA Physical Layer Aspects", 3GPP TR 36.814, vol. 1.5.0, Release 9, Nov. 2009, 53 pages.
"Feasibility study for Further Advancements for E-UTRA (LTE-Advanced)", 3GPP TR 36.912, vol. 9.0.0, Release 9, Sep. 2009, 256 pages.
"Relay Node Access Link with different Carriers", HTC Corporation, 3GPP TSG-RAN WG1 #59, R1-094452, Nov. 9-13, 2009, 3 pages.
"Evolved Universal Terrestrial Radio Access (E-UTRA) Radio Resource Control (RRC); Protocol specification", 3GPP TS 36.331, vol. 9.0.0, Release 9, Sep. 2009, 213 pages.
Combined Chinese Office Action and Search Report issued on Nov. 2, 2014 in Patent Application No. 201180009026.7 with partial English translation.
Japanese Office Action issued Aug. 26, 2014, in Japan Patent Application No. 2011-553859 (with English translation).
Office Action issued on Dec. 2, 2014 in Japanese Patent Application No. 2011-553859 with partial English translation.
U.S. Appl. No. 14/419,139, filed Feb. 2, 2015, Mochizuki, et al.
Office Action issued May 19, 2015 in Chinese Patent Application No. 201180009026.7 (with partial English translation).
Office Action issued Dec. 1, 2015 in Japanese Patent Application No. 2015-036179 (with English language translation).
Ericsson, et al., "Text proposal to correct relaying text in TR36.814 and TR36.912" 3GPP TSG RAN WG1 Meeting #59bis, Jan. 2010, 6 Pages.
European Search Report dated Aug. 22, 2016, issued in European Patent Application No. 11742251.9.
Alcatel Shanghai Bell et al: "Relaying for LTE-Advanced", 3GPP Draft; R1-084136_Relaying for LTE-Advanced_Final, 3$^{rd}$ Generation Partnership Project (3GPP), Mobile Competence Centre; 650, Route Des Lucioles; F-06921 Sophia-Antipolis Cedex; France, No. Prague, Czech Republic; Nov. 5, 2008.
Japanese Office Action issued Dec. 13, 2016 in Patent Application No. 2016-015720 (with partial English translation).
Office Action issued May 9, 2017 in Japanese Patent Application No. 2016-015720 (with partial English translation).
Office Action dated May 9, 2017 in Japanese Patent Application No. 2016-015720 (with partial English translation).

\* cited by examiner

FIG. 5 BACKGROUND ART
(A)
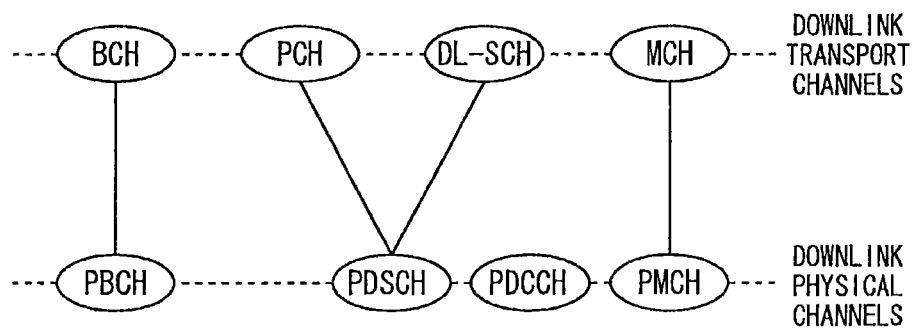
(B)
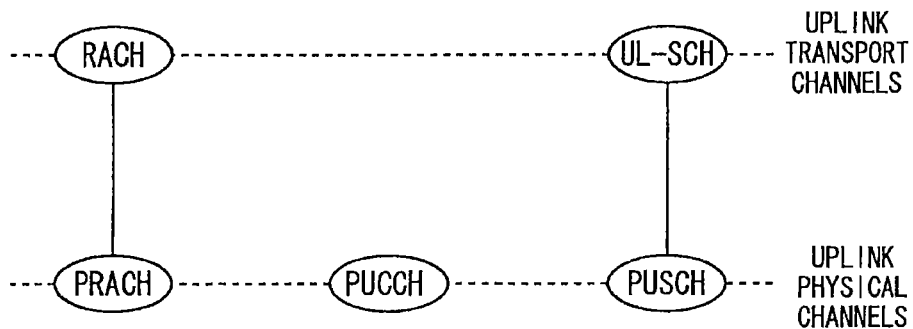

F I G. 6    BACKGROUND ART
(A)
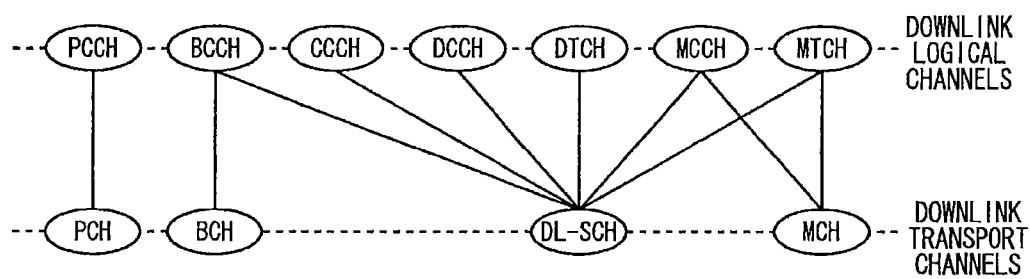
(B)
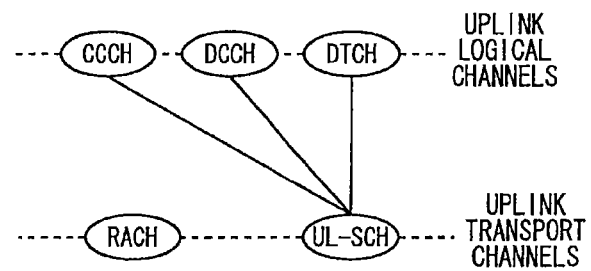

F I G. 1 1
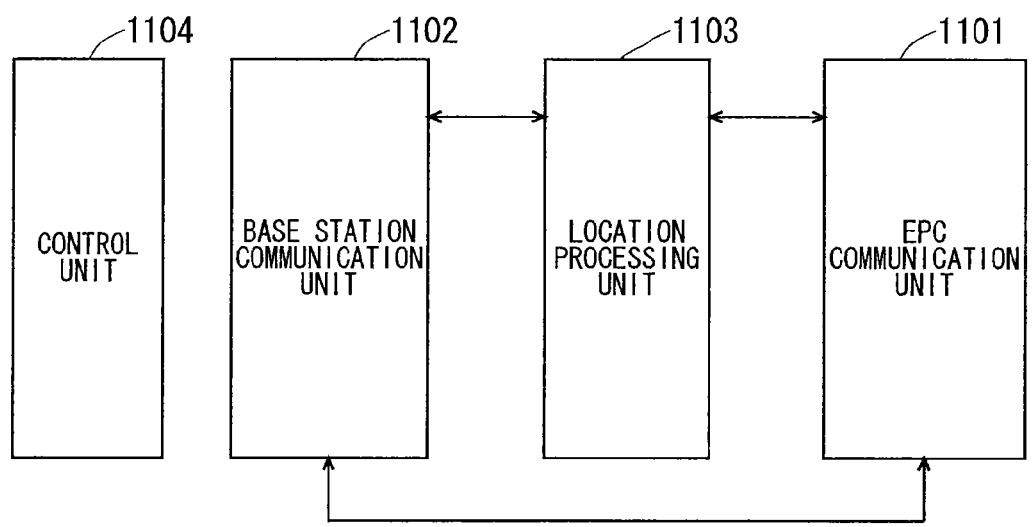

F I G . 1 3
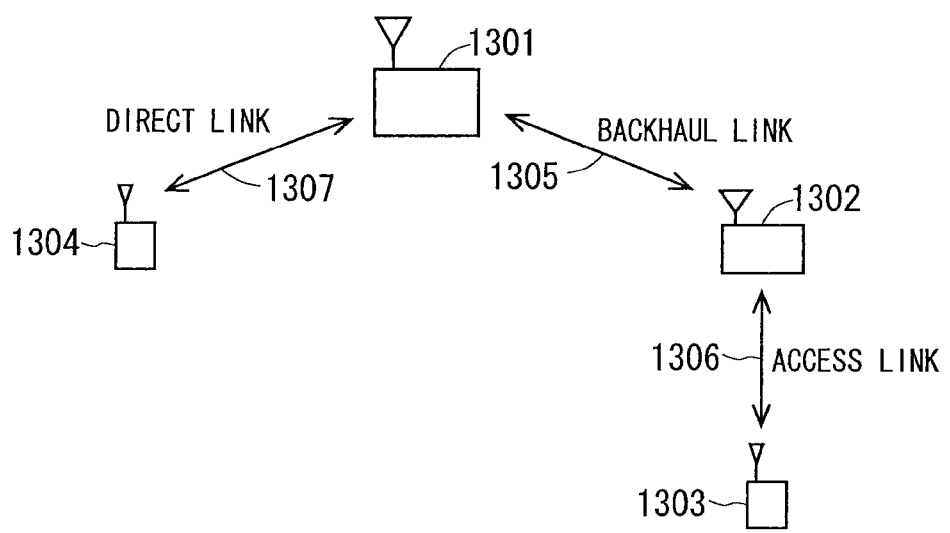

F I G . 1 4
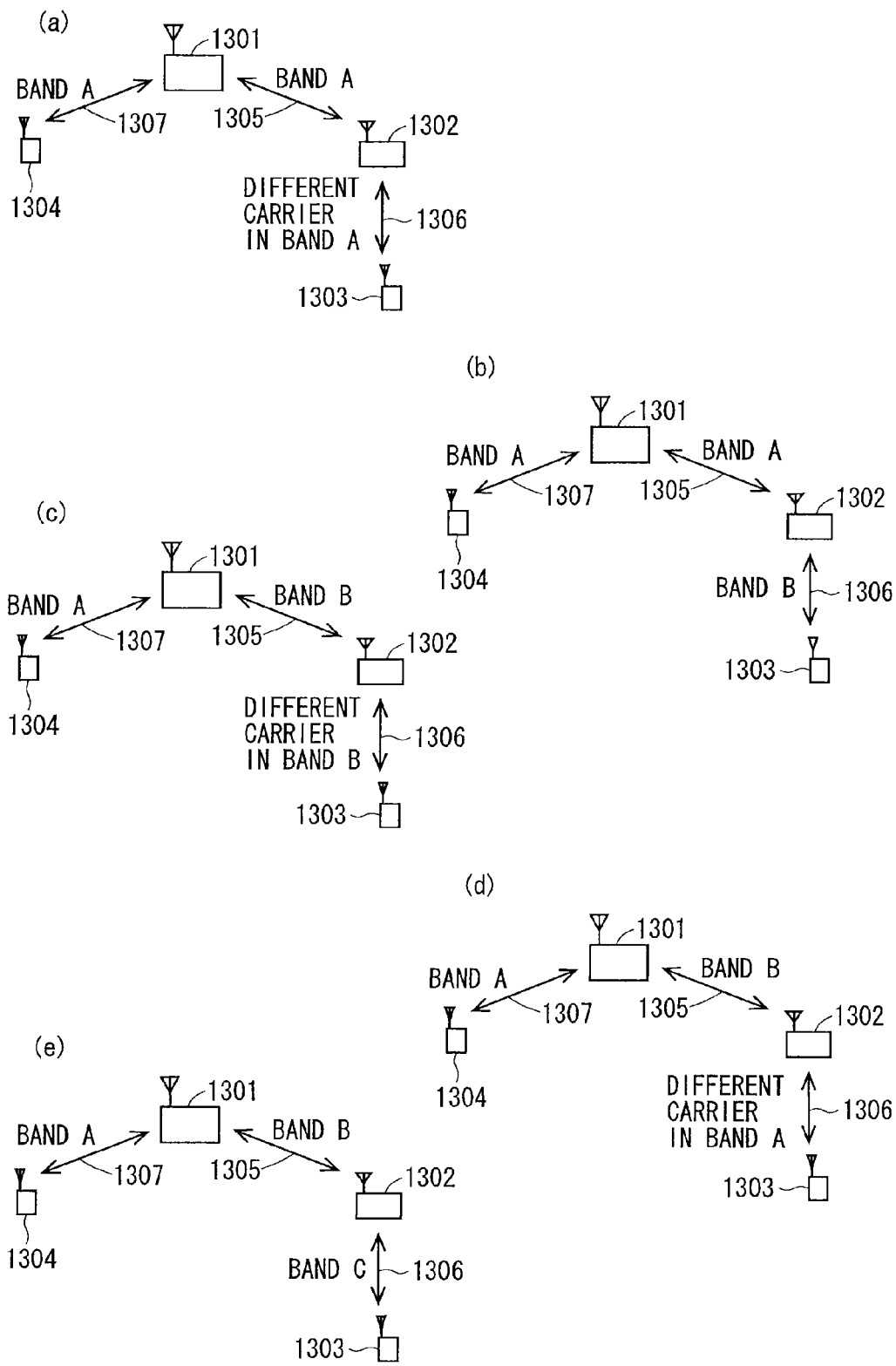

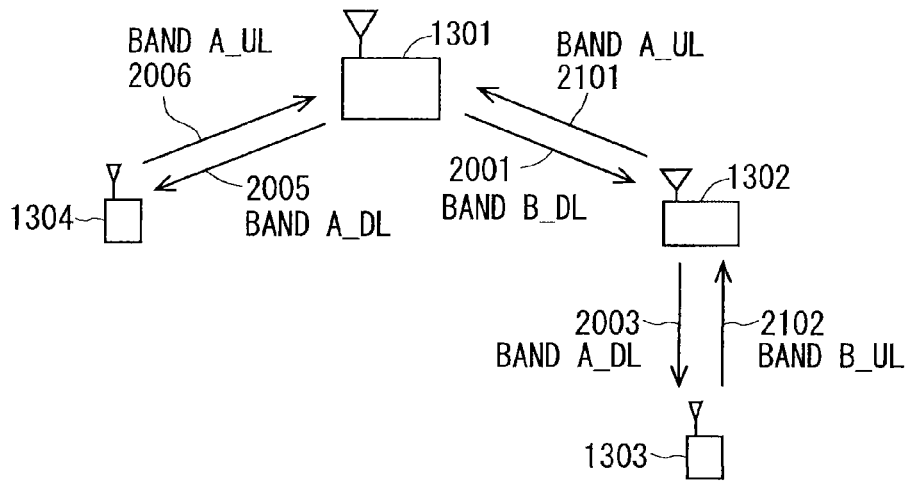
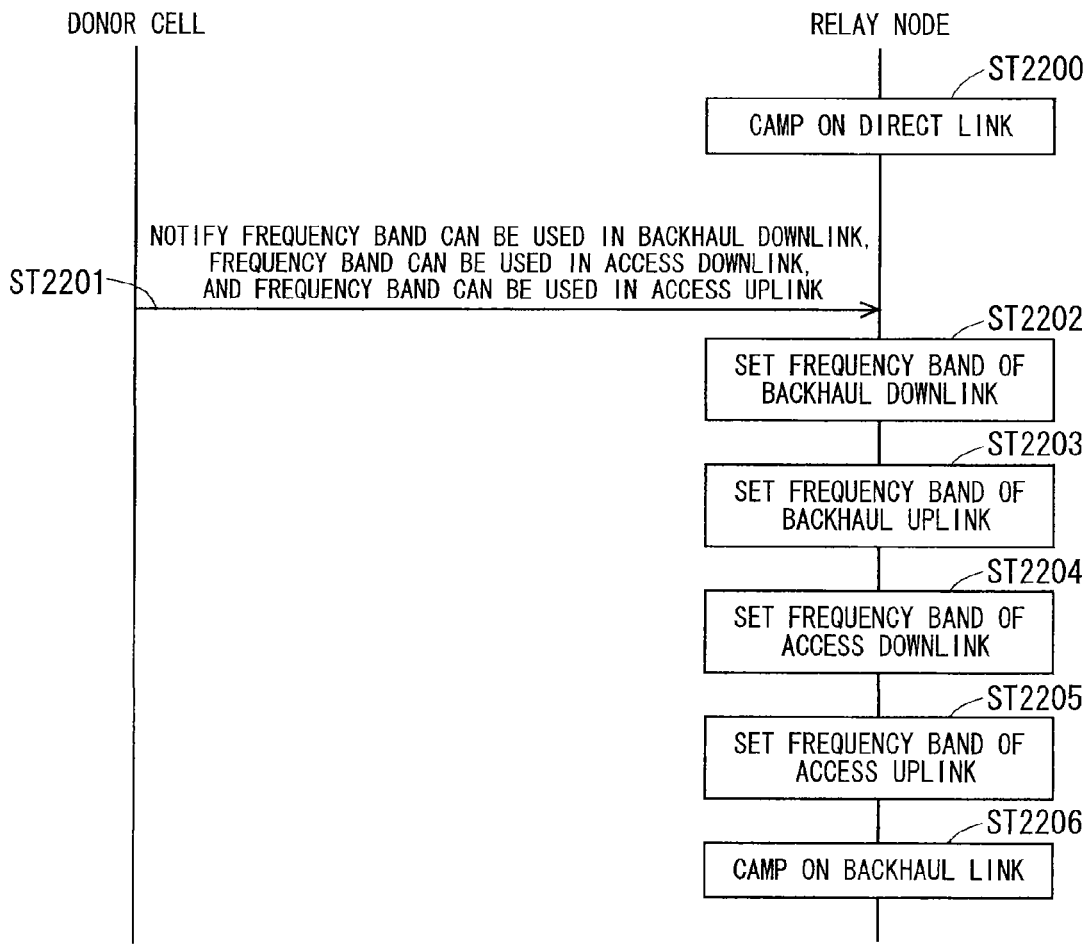

MOBILE COMMUNICATION SYSTEM

TECHNICAL FIELD

The present invention relates to a mobile communication system in which a base station performs radio communication with a plurality of user equipments.

BACKGROUND ART

Commercial service of a wideband code division multiple access (W-CDMA) system among so-called third-generation communication systems has been offered in Japan since 2001. In addition, high speed downlink packet access (HSDPA) service for achieving higher-speed data transmission using a downlink has been offered by adding a channel for packet transmission (high speed-downlink shared channel (HS-DSCH)) to the downlink (dedicated data channel, dedicated control channel). Further, in order to increase the speed of data transmission in an uplink direction, service of a high speed uplink packet access (HSUPA) system has been offered. W-CDMA is a communication system defined by the 3rd generation partnership project (3GPP) that is the standard organization regarding the mobile communication system, where the specifications of Release 8 version are produced.

Further, 3GPP is studying new communication systems referred to as long term evolution (LTE) regarding radio areas and system architecture evolution (SAE) regarding the overall system configuration including a core network (merely referred to as network as well) as communication systems independent of W-CDMA.

In the LTE, an access scheme, a radio channel configuration and a protocol are totally different from those of the current W-CDMA (HSDPA/HSUPA). For example, as to the access scheme, code division multiple access is used in the W-CDMA, whereas in the LTE, orthogonal frequency division multiplexing (OFDM) is used in a downlink direction and single career frequency division multiple access (SC-FDMA) is used in an uplink direction. In addition, the bandwidth is 5 MHz in the W-CDMA, while in the LTE, the bandwidth can be selected from 1.4 MHz, 3 MHz, 5 MHz, 10 MHz, 15 MHz and 20 MHz for each base station. Further, differently from the W-CDMA, circuit switching is not provided but a packet communication system is only provided in the LTE.

The LTE is defined as a radio access network independent of the W-CDMA network because its communication system is configured with a new core network different from a core network (general packet radio service: GPRS) of the W-CDMA. Therefore, for differentiation from the W-CDMA communication system, a base station that communicates with a user equipment (UE) and a radio network controller that transmits/receives control data and user data to/from a plurality of base stations are referred to as an E-UTRAN NodeB (eNB) and an evolved packet core (EPC) or access gateway (aGW), respectively, in the LTE communication system. Unicast service and evolved multimedia broadcast multicast service (E-MBMS service) are provided in this LTE communication system. The E-MBMS service is broadcast multimedia service, which is merely referred to as MBMS in some cases. Bulk broadcast contents such as news, weather forecast and mobile broadcast are transmitted to a plurality of user equipments. This is also referred to as point to multipoint service.

Non-Patent Document 1 (Chapter 4.6.1) describes current decisions by 3GPP regarding an overall architecture in the LTE system. The overall architecture is described with reference to FIG. 1. FIG. 1 is a diagram illustrating the configuration of the LTE communication system. With reference to FIG. 1, the evolved universal terrestrial radio access (E-UTRAN) is composed of one or a plurality of base stations 102, provided that a control protocol for a user equipment 101 such as a radio resource control (RRC) and user planes such as a packet data convergence protocol (PDCP), radio link control (RLC), medium access control (MAC) and physical layer (PHY) are terminated in the base station 102.

The base stations 102 perform scheduling and transmission of paging signal (also referred to as paging messages) notified from a mobility management entity (MME) 103. The base stations 102 are connected to each other by means of an X2 interface. In addition, the base stations 102 are connected to an evolved packet core (EPC) by means of an S1 interface. More specifically, the base station 102 is connected to the mobility management entity (MME) 103 by means of an S1_MME interface and connected to a serving gateway (S-GW) 104 by means of an S1_U interface.

The MME 103 distributes the paging signal to a plurality of or a single base station 102. In addition, the MME 103 performs mobility control of an idle state. When the user equipment is in the idle state and an active state, the MME 103 manages a list of tracking areas.

The S-GW 104 transmits/receives user data to/from one or a plurality of base stations 102. The S-GW 104 serves as a local mobility anchor point in handover between base stations. Moreover, a PDN gateway (P-GW) is provided in the EPC, which performs per-user packet filtering and UE-ID address allocation.

The control protocol RRC between the user equipment 101 and the base station 102 performs broadcast, paging, RRC connection management and the like. The states of the base station and the user equipment in RRC are classified into RRC_Idle and RRC_CONNECTED. In RRC_IDLE, public land mobile network (PLMN) selection, system information (SI) broadcast, paging, cell reselection, mobility and the like are performed. In RRC_CONNECTED, the user equipment has RRC connection, is capable of transmitting/receiving data to/from a network, and performs, for example, handover (HO) and measurement of a neighbor cell. RRC_IDLE is merely referred to as IDLE or idle state as well. RRC_CONNECTED is merely referred to as CONNECTED as well.

The current decisions by 3GPP regarding the frame configuration in the LTE system described in Non-Patent Document 1 (Chapter 5) are described with reference to FIG. 2. FIG. 2 is a diagram illustrating the configuration of a radio frame used in the LTE communication system. With reference to FIG. 2, one radio frame is 10 ms. The radio frame is divided into ten equally sized subframes. The subframe is divided into two equally sized slots. The first and sixth subframes contain a downlink synchronization signal (SS) per each radio frame. The synchronization signals are classified into a primary synchronization signal (P-SS) and a secondary synchronization signal (S-SS). Multiplexing of channels for multimedia broadcast multicast service single frequency network (MBSFN) and for non-MBSFN is performed on a per-subframe basis. Hereinafter, a subframe for MBSFN transmission is referred to as an MBSFN subframe.

Non-Patent Document 2 describes a signaling example when MBSFN subframes are allocated. FIG. 3 is a diagram illustrating the configuration of the MBSFN frame. With reference to FIG. 3, the MBSFN subframes are allocated for each MBSFN frame. An MBSFN frame cluster is scheduled. A repetition period of the MBSFN frame cluster is allocated.

Non-Patent Document 1 (Chapter 5) describes the current decisions by 3GPP regarding the channel configuration in the LTE system. It is assumed that the same channel configuration is used in a closed subscriber group cell (CSG cell) as that of a non-CSG cell. A physical channel is described with reference to FIG. 4. FIG. 4 is a diagram illustrating physical channels used in the LTE communication system. With reference to FIG. 4, a physical broadcast channel (PBCH) 401 is a downlink channel transmitted from the base station 102 to the user equipment 101. A BCH transport block is mapped to four subframes within a 40 ms interval. There is no explicit signaling indicating 40 ms timing. A physical control format indicator channel (PCFICH) 402 is transmitted from the base station 102 to the user equipment 101. The PCFICH notifies the number of OFDM symbols used for PDCCHs from the base station 102 to the user equipment 101. The PCFICH is transmitted in each subframe.

A physical downlink control channel (PDCCH) 403 is a downlink channel transmitted from the base station 102 to the user equipment 101. The PDCCH notifies the resource allocation, HARQ information related to DL-SCH (downlink shared channel that is one of the transport channels shown in FIG. 5 described below) and the PCH (paging channel that is one of the transport channels shown in FIG. 5). The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) 404 is a downlink channel transmitted from the base station 102 to the user equipment 101. A DL-SCH (downlink shared channel) that is a transport channel and a PCH that is a transport channel are mapped to the PDSCH. A physical multicast channel (PMCH) 405 is a downlink channel transmitted from the base station 102 to the user equipment 101. A multicast channel (MCH) that is a transport channel is mapped to the PMCH.

A physical uplink control channel (PUCCH) 406 is an uplink channel transmitted from the user equipment 101 to the base station 102. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR). A physical uplink shared channel (PUSCH) 407 is an uplink channel transmitted from the user equipment 101 to the base station 102. A UL-SCH (uplink shared channel that is one of the transport channels shown in FIG. 5) is mapped to the PUSCH.

A physical hybrid ARQ indicator channel (PHICH) 408 is a downlink channel transmitted from the base station 102 to the user equipment 101. The PHICH carries Ack/Nack that is a response to uplink transmission. A physical random access channel (PRACH) 409 is an uplink channel transmitted from the user equipment 101 to the base station 102. The PRACH carries a random access preamble.

A downlink reference signal which is a known symbol in a mobile communication system is inserted in the first, third and last OFDM symbols of each slot. The physical layer measurement objects of a user equipment include, for example, reference symbol received power (RSRP).

The transport channel described in Non-Patent Document 1 (Chapter 5) is described with reference to FIG. 5. FIG. 5 is a diagram illustrating transport channels used in the LTE communication system. Part (A) of FIG. 5 shows mapping between a downlink transport channel and a downlink physical channel. Part (B) of FIG. 5 shows mapping between an uplink transport channel and an uplink physical channel. A broadcast channel (BCH) is broadcast to the entire base station (cell) regarding the downlink transport channel. The BCH is mapped to the physical broadcast channel (PBCH).

Retransmission control according to a hybrid ARQ (HARQ) is applied to a downlink shared channel (DL-SCH). The DL-SCH enables broadcast to the entire base station (cell). The DL-SCH supports dynamic or semi-static resource allocation. The semi-static resource allocation is also referred to as persistent scheduling. The DL-SCH supports discontinuous reception (DRX) of a user equipment for enabling the user equipment to save power. The DL-SCH is mapped to the physical downlink shared channel (PDSCH).

The paging channel (PCH) supports DRX of the user equipment for enabling the user equipment to save power. Broadcast to the entire base station (cell) is required for the PCH. The PCH is mapped to physical resources such as the physical downlink shared channel (PDSCH) that can be used dynamically for traffic or physical resources such as the physical downlink control channel (PDCCH) of the other control channel. The multicast channel (MCH) is used for broadcast to the entire base station (cell). The MCH supports SFN combining of MBMS service (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH). The UL-SCH supports dynamic or semi-static resource allocation. The UL-SCH is mapped to the physical uplink shared channel (PUSCH). A random access channel (RACH) shown in part (B) of FIG. 5 is limited to control information. The RACH involves a collision risk. The RACH is mapped to the physical random access channel (PRACH).

The HARQ is described. The HARQ is the technique for improving the communication quality of a channel by combination of automatic repeat request and forward error correction. The HARQ has an advantage that error correction functions effectively by retransmission even for a channel whose communication quality changes. In particular, it is also possible to achieve further quality improvement in retransmission through combination of the reception results of the first transmission and the reception results of the retransmission.

An example of the retransmission method is described. In a case where the receiver fails to successfully decode the received data, in other words, in a case where a cyclic redundancy check (CRC) error occurs (CRC=NG), the receiver transmits "Nack" to the transmitter. The transmitter that has received "Nack" retransmits the data. In a case where the receiver successfully decodes the received data, in other words, in a case where a CRC error does not occur (CRC=OK), the receiver transmits "AcK" to the transmitter. The transmitter that has received "Ack" transmits the next data.

Examples of the HARQ system include chase combining. In chase combining, the same data sequence is transmitted in the first transmission and retransmission, which is the system for improving gains by combining the data sequence of the first transmission and the data sequence of the retransmission in retransmission. This is based on the idea that correct data is partially included even if the data of the first transmission contains an error, and highly accurate data transmission is enabled by combining the correct portions of the first transmission data and the retransmission data. Another example of the HARQ system is incremental redundancy (IR). The IR is aimed to increase redundancy, where a parity bit is transmitted in retransmission to increase the redundancy by combining the first transmission and retransmission, to thereby improve the quality by an error correction function.

A logical channel (hereinafter, referred to as "logical channel" in some cases) described in Non-Patent Document 1 (Chapter 6) is described with reference to FIG. 6. FIG. 6 is a diagram illustrating logical channels used in an LTE communication system. Part (A) of FIG. 6 shows mapping between a downlink logical channel and a downlink transport channel. Part (B) of FIG. 6 shows mapping between an uplink logical channel and an uplink transport channel. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging signals. The PCCH is used when the network does not know the cell location of a user equipment. The PCCH that is a logical channel is mapped to the paging channel (PCH) that is a transport channel. A common control channel (CCCH) is a channel for transmission control information between user equipments and a base station. The CCCH is used in a case where the user equipments have no RRC connection with the network. In a downlink direction, the CCCH is mapped to the downlink shared channel (DL-SCH) that is a transport channel. In an uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a user equipment. The MCCH is a channel used only by a user equipment during reception of the MBMS. The MCCH is mapped to the downlink shared channel (DL-SCH) or multicast channel (MCH) that is a transport channel.

A dedicated control channel (DCCH) is a channel that transmits dedicated control information between a user equipment and a network. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated user equipment. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a user equipment. The MTCH is a channel used only by a user equipment during reception of the MBMS. The MTCH is mapped to the downlink shared channel (DL-SCH) or multicast channel (MCH).

GCI represents a global cell identity. A closed subscriber group cell (CSG cell) is introduced in the LTE and universal mobile telecommunication system (UMTS). The CSG is described below (see Chapter 3.1 of Non-Patent Document 3). The closed subscriber group (CSG) is a cell (cell for specific subscribers) in which subscribers who are allowed to use are specified by an operator. The specified subscribers are allowed to access one or more E-UTRAN cells of a public land mobile network (PLMN). One or more E-UTRAN cells in which the specified subscribers are allowed access are referred to as "CSG cell(s)". Note that access is limited in the PLMN. The CSG cell is part of the PLMN that broadcasts a specific CSG identity (CSG ID, CSG-ID). The authorized members of the subscriber group who have registered in advance access the CSG cells using the CSG-ID that is the access permission information.

The CSG-ID is broadcast by the CSG cell or cells. A plurality of CSG-IDs exist in a mobile communication system. The CSG-IDs are used by user equipments (UEs) for making access from CSG-related members easier. The locations of user equipments are traced based on an area composed of one or more cells. The locations are traced for enabling tracing of the locations of user equipments and calling (calling of user equipments) even in an idle state. An area for tracing locations of user equipments is referred to as a tracking area. A CSG whitelist is a list stored in a universal subscriber identity module (USIM) in which all CSG IDs of the CSG cells to which the subscribers belong are recorded. The CSG whitelist is also referred to as an allowed CSG ID list in some cases.

A "suitable cell" is described below (see Chapter 4.3 of Non-Patent Document 3). The "suitable cell" is a cell on which a UE camps to obtain normal service. Such a cell shall fulfill the following conditions.

(1) The cell is part of the selected PLMN or the registered PLMN, or part of the PLMN of an "equivalent PLMN list".

(2) According to the latest information provided by a non-access stratum (NAS), the cell shall further fulfill the following conditions:
  (a) the cell is not a barred cell;
  (b) the cell is part of at least one tracking area (TA), not part of "forbidden LAs for roaming", where the cell needs to fulfill (1) above;
  (c) the cell shall fulfill the cell selection criteria; and
  (d) for a cell specified as CSG cell by system information (SI), the CSG-ID is part of a "CSG whitelist" of the UE (contained in the CSG whitelist of the UE).

An "acceptable cell" is described below (see Chapter 4.3 of Non-Patent Document 3). This is the cell on which a UE camps to obtain limited service (emergency calls). Such a cell shall fulfill all the following requirements. That is, the minimum required set for initiating an emergency call in an E-UTRAN network are as follows: (1) the cell is not a barred cell; and (2) the cell fulfills the cell selection criteria.

Camping on a cell represents the state where a UE has completed the cell selection/reselection process and the UE has selected a cell for monitoring the system information and paging information.

3GPP is studying base stations referred to as Home-NodeB (Home-NB; HNB) and Home-eNodeB (Home-eNB; HeNB). HNB/HeNB is a base station for, for example, household, corporation or commercial access service in UTRAN/E-UTRAN. Non-Patent Document 4 discloses three different modes of the access to the HeNB and HNB. Specifically, those are an open access mode, a closed access mode and a hybrid access mode.

The respective modes have the following characteristics. In the open access mode, the HeNB and HNB are operated as a normal cell of a normal operator. In the closed access mode, the HeNB and HNB are operated as a CSG cell. The CSG cell is a cell where only CSG members are allowed access. In the hybrid access mode, non-CSG members are allowed access at the same time. In other words, a cell in the hybrid access mode (also referred to as hybrid cell) is the cell that supports both the open access mode and the closed access mode.

3GPP discusses that all physical cell identities (PCIs) are split (referred to as PCI-split) into ones reserved for CSG cells and the others reserved for non-CSG cells (see Non-Patent Document 5). Further, 3GPP discusses that the PCI split information is broadcast in the system information from the base station to the user equipments being served thereby. Non-Patent Document 5 discloses the basic operation of a user equipment using PCI split. The user equipment that does not have the PCI split information needs to perform cell search using all PCIs (for example, using all 504 codes). On the other hand, the user equipment that has the PCI split information is capable of performing cell search using the PCI split information.

Further, 3GPP is pursuing specifications standard of long term evolution advanced (LTE-A) as Release 10 (see Non-Patent Document 6 and Non-Patent Document 7).

As one of the techniques to be studied in LTE-A, heterogeneous networks (HetNets) are added. 3GPP has decided to handle low-output-power network nodes with low output power in a local area range, such as pico eNB (pico cell), node for hotzone cells, HeNB/HNB/CSG cell, relay node, remote radio head (RRH). Networks in which one or more of the above-mentioned network nodes in a local area range are incorporated in a normal eNB (macro cell) are heterogeneous networks.

As to the LTE-A system, it is studied in that a relay (relay node (RN)) is supported for achieving a high data rate, high cell-edge throughput, new coverage area or the like. The relay node is wirelessly connected to the radio-access network via a donor cell (Donor eNB; DeNB). The network (NW)-to-relay node link shares the same frequency band with the network-to-UE link within the range of the donor cell. In this case, the UE can also be connected to the donor cell in the specifications of Release 8 of 3GPP. The link between a donor cell and a relay node is referred to as a backhaul link, the link between the relay node and the UE is referred to as an access link, and the link between the network and the UE is referred to as a direct link.

As the method of multiplexing backhaul links in frequency division duplex (FDD), the transmission from DeNB to RN is done in the downlink (DL) frequency band, whereas the transmission from RN to DeNB is done in the uplink (UL) frequency band. As the method of partitioning resources at the relay, the link from DeNB to RN and link from RN to UE are time division multiplexed in a single frequency band, and the link from RN to DeNB and the link from UE to RN are time division multiplexed in a single frequency band as well. This prevents, in the relay node, the transmission of the relay node from causing interference to the reception of its own relay node. The interference caused by the transmission of a relay node to the reception of its own relay node is also referred to as self-interference in some cases.

As described above, in the conventional technique, the link from a donor cell to a relay node and the link from a relay node to a user equipment being served by the relay node are time division multiplexed in one frequency band, and the link from a relay node to a donor cell and the link from a user equipment being served by a relay node to the relay node are time division multiplexed in one frequency band for preventing self-interference. The time division multiplexing described above decreases the throughput, leading to a problem that the system performance degrades.

In order to solve this problem, Non-Patent Document 8 discloses that the access link and backhaul link are operated in different carrier frequencies or different frequency bands. According to the technique disclosed in Non-Patent Document 8, it is not required to use time division multiplexing, which improves a throughput.

A user equipment selects a downlink (or cell) with good reception quality through a search operation. The frequency band of an uplink with respect to the selected downlink is notified in the broadcast information (see Non-Patent Document 9).

PRIOR ART DOCUMENTS

Non-Patent Documents

Non-Patent Document 1: 3GPP TS36.300 V9.1.0 Chapter 4.6.1, Chapter 4.6.2, Chapter 5, Chapter 6, and Chapter 10.7
Non-Patent Document 2: 3GPP R1-072963
Non-Patent Document 3: 3GPP TS36.304 V9.0.0 Chapter 3.1, Chapter 4.3 and Chapter 5.2.4
Non-Patent Document 4: 3GPP S1-083461
Non-Patent Document 5: 3GPP R2-082899
Non-Patent Document 6: 3GPP TR36.814 V1.5.0
Non-Patent Document 7: 3GPP TR36.912 V9.0.0
Non-Patent Document 8: 3GPP R1-094452
Non-Patent Document 9: 3GPP TS36.331 V9.0.0

SUMMARY OF INVENTION

Problem to be Solved by the Invention

In the technique disclosed in Non-Patent Document 8, the carrier frequency differs between the direct link and access link, which increases the load of a user equipment in a search operation. This causes a control delay of a user equipment, leading to a problem that power consumption increases.

An object of the present invention is to provide a mobile communication system capable of preventing interference in a communication system such as interference of network nodes in a local area range as well as reducing the load of a user equipment in a search operation.

Means to Solve the Problem

A mobile communication system according to the present invention includes a base station device, a user equipment device configured to perform radio communication with the base station device, and a relay device relaying the radio communication between the base station device and the user equipment device, wherein: the relay device performs radio communication with the user equipment device using a carrier having a different frequency from that of a carrier used in radio communication with the base station device; and the base station device performs radio communication with the user equipment device using a carrier having the same frequency as that of the carrier used in the radio communication between the relay device and the user equipment device.

Further, a mobile communication system according to the present invention includes a base station device, a user equipment device configured to perform radio communication with the base station device, and a relay device relaying the radio communication between the base station device and the user equipment device, wherein: the relay device performs radio communication with the user equipment device using a carrier having a different frequency from that of a carrier used in radio communication with the base station device; and the base station device notifies the user equipment device of the information related to a radio communication link between the relay device and the user equipment device.

Further, a mobile communication system according to the present invention includes a plurality of base station devices and a user equipment device configured to perform radio communication with the base station devices, wherein: each of the base station devices performs, in a downlink of radio communication to the user equipment device, radio communication using a carrier having the same frequency as that of a carrier used in a downlink of radio communication from another base station device to the user equipment device; and each of the base station devices performs, in an uplink of radio communication from the user equipment device, radio communication using a carrier having a different frequency from that of a carrier used in an uplink of radio communication from the user equipment device to the another base station device.

Effects of the Invention

According to the mobile communication system of the present invention, the relay device performs radio communication with the user equipment device using the carrier having a different frequency from that of the carrier used in radio communication with the base station device, whereby it is possible to reduce the self-interference of the relay device, that is, the interference of the radio communication between the relay device and the base station device and the radio communication between the relay device and the user equipment device. In addition, the base station device performs radio communication with the user equipment device using the carrier having the same frequency as that of the carrier used in the radio communication between the relay device and the user equipment device, whereby it is possible to simplify the search operation in which the user equipment device searches for the base station device or relay device as a communication target. This reduces the load of the user equipment device in a search operation. Therefore, it is possible to prevent the interference in the mobile communication system and reduce the load of the user equipment device in the search operation.

Further, according to the mobile communication system of the present invention, the relay device performs radio communication with the user equipment device using the carrier having a different frequency from that of the carrier used in radio communication with the base station device, whereby it is possible to reduce the self-interference of the relay device, that is, the interference of the radio communication between the relay device and the base station device and the radio communication between the relay device and the user equipment device. In addition, the base station device notifies the user equipment device of the information related to the radio communication link between the relay device and the user equipment device, whereby the user equipment device is allowed to search for the relay device based on the information related to the radio communication link between the relay device and the user equipment device that has been notified from the base station device. This simplifies the search operation in which the user equipment device searches for the base station device or relay device as a target communication device, which reduces the load of the user equipment device in a search operation. Therefore, it is possible to prevent the interference in the mobile communication system and reduce the load of the user equipment device in the search operation.

Further, according to the mobile communication system of the present invention, each base station device performs radio communication using the carrier having the same frequency as that of the carrier used in the downlink of radio communication from another base station device to the user equipment device in a downlink of radio communication to the user equipment device. This simplifies the search operation in which the user equipment device searches for the base station device among a plurality of base station devices as a communication target, which reduces the load of the user equipment device in a search operation. In addition, each base station device performs radio communication using the carrier having a different frequency from that of the carrier used in the uplink of radio communication from the user equipment device to another base station device in the uplink of radio communication from the user equipment device. This reduces the uplink interference that is the interference in the uplink radio communication from the user equipment device to each base station device. Therefore, it is possible to prevent the uplink interference and reduce the load of the user equipment device in the search operation.

These and other objects, features, aspects and advantages of the present invention will become more apparent from the following detailed description of the present invention when taken in conjunction with the accompanying drawings.

BRIEF DESCRIPTION OF DRAWINGS

FIG. 5 is a diagram illustrating transport channels used in the LTE communication system.

FIG. 6 is a diagram illustrating logical channels used in the LTE communication system.

FIG. 11 is a block diagram showing the configuration of a HeNBGW 74 shown in FIG. 7 that is a HeNBGW according to the present invention.

FIG. 13 is a diagram illustrating a relay node disclosed in Non-Patent Document 7.

FIG. 14 is a diagram illustrating a relay node disclosed in Non-Patent Document 8.

FIG. 21 is a diagram illustrating a relay node in a case where a solution of a first modification of the first embodiment is used.

FIG. 22 is a diagram illustrating a sequence example of a mobile communication system in a case where the solution of the first modification of the first embodiment is used.

EMBODIMENTS FOR CARRYING OUT THE INVENTION

First Embodiment

Figure 1:
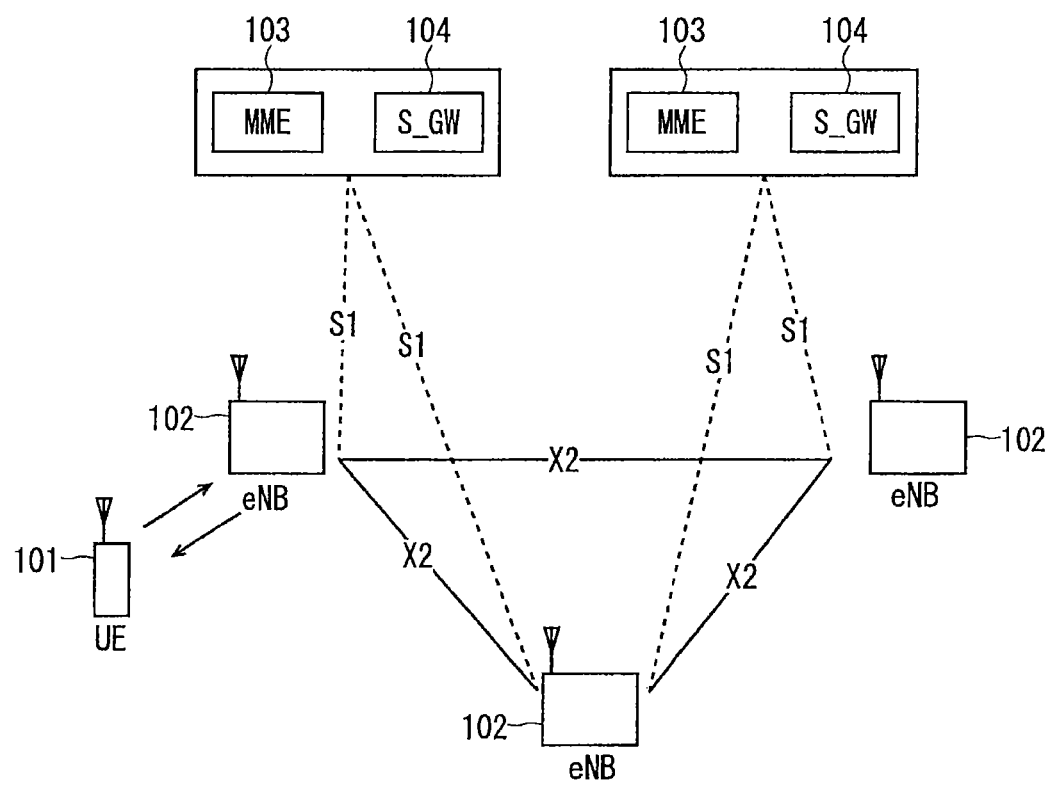
FIG. 1 is a diagram illustrating the configuration of an LTE communication system.
Figure 2:
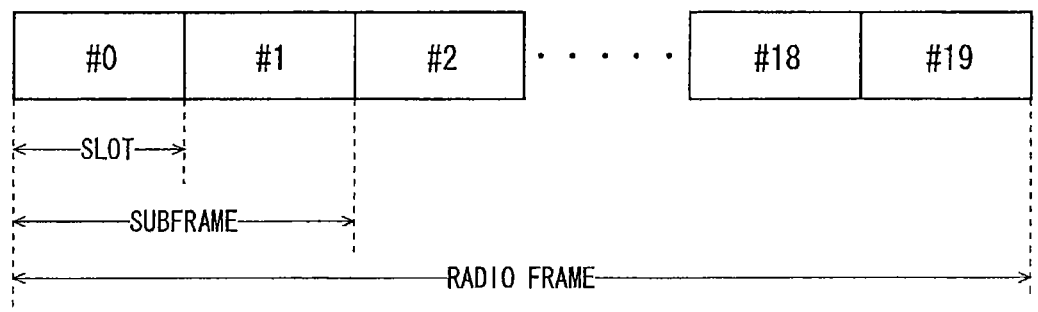
FIG. 2 is a diagram illustrating the configuration of a radio frame used in the LTE communication system.
Figure 3:
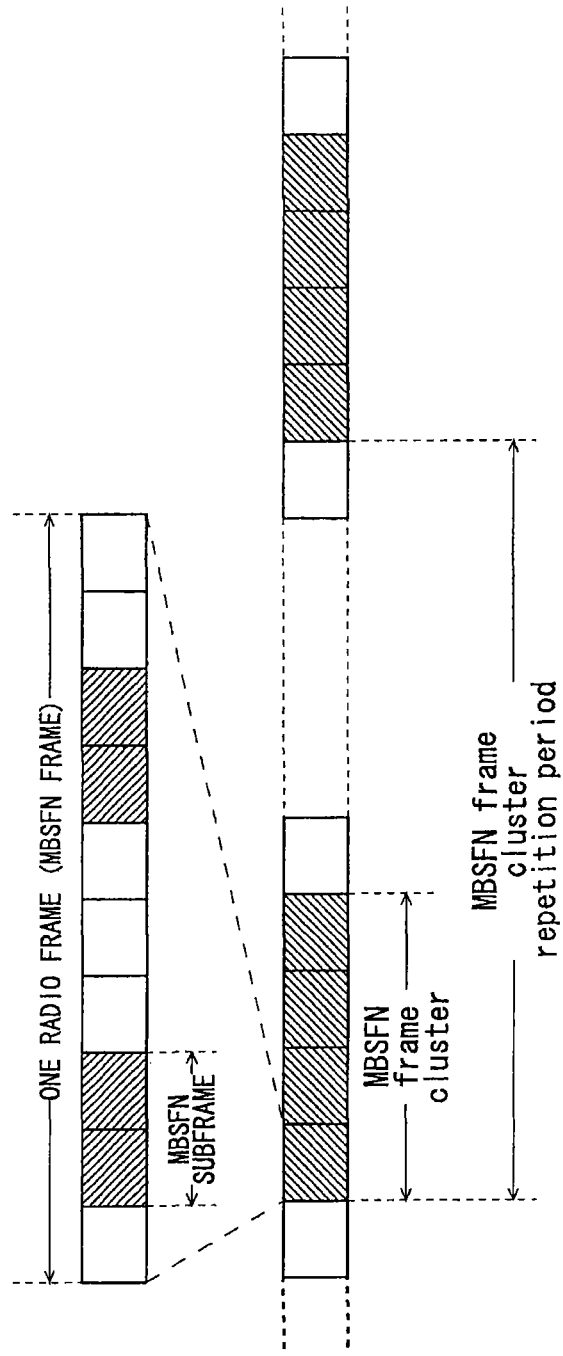
FIG. 3 is a diagram illustrating the configuration of an MBSFN frame.
Figure 4:
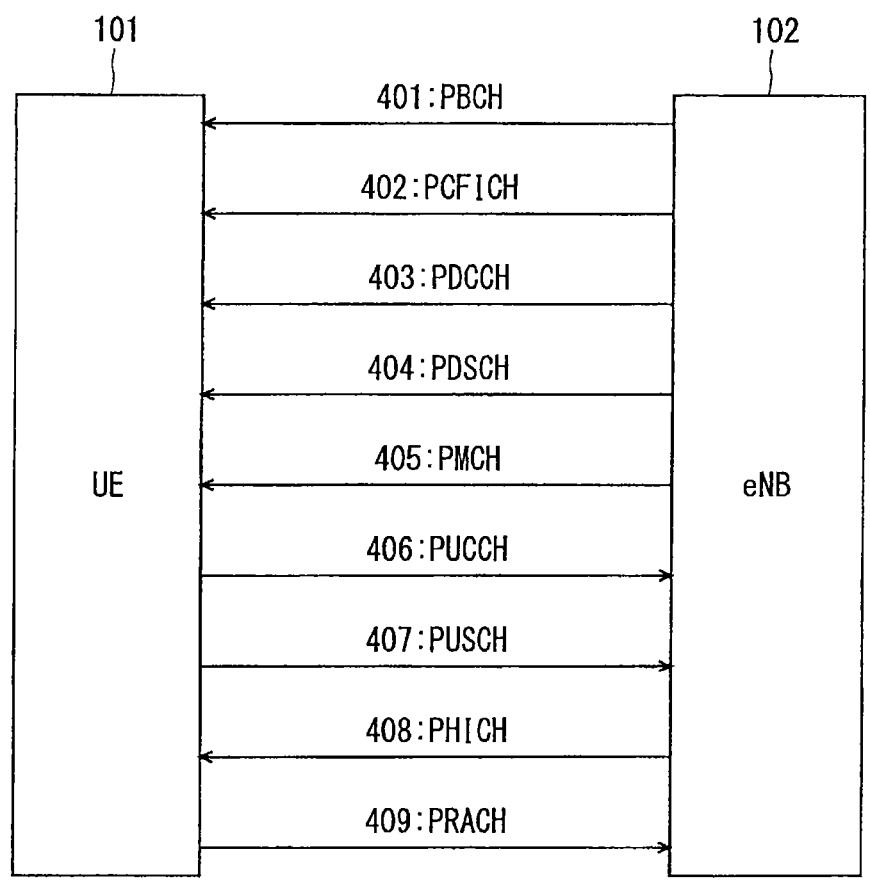
FIG. 4 is a diagram illustrating physical channels used in the LTE communication system.
Figure 7:
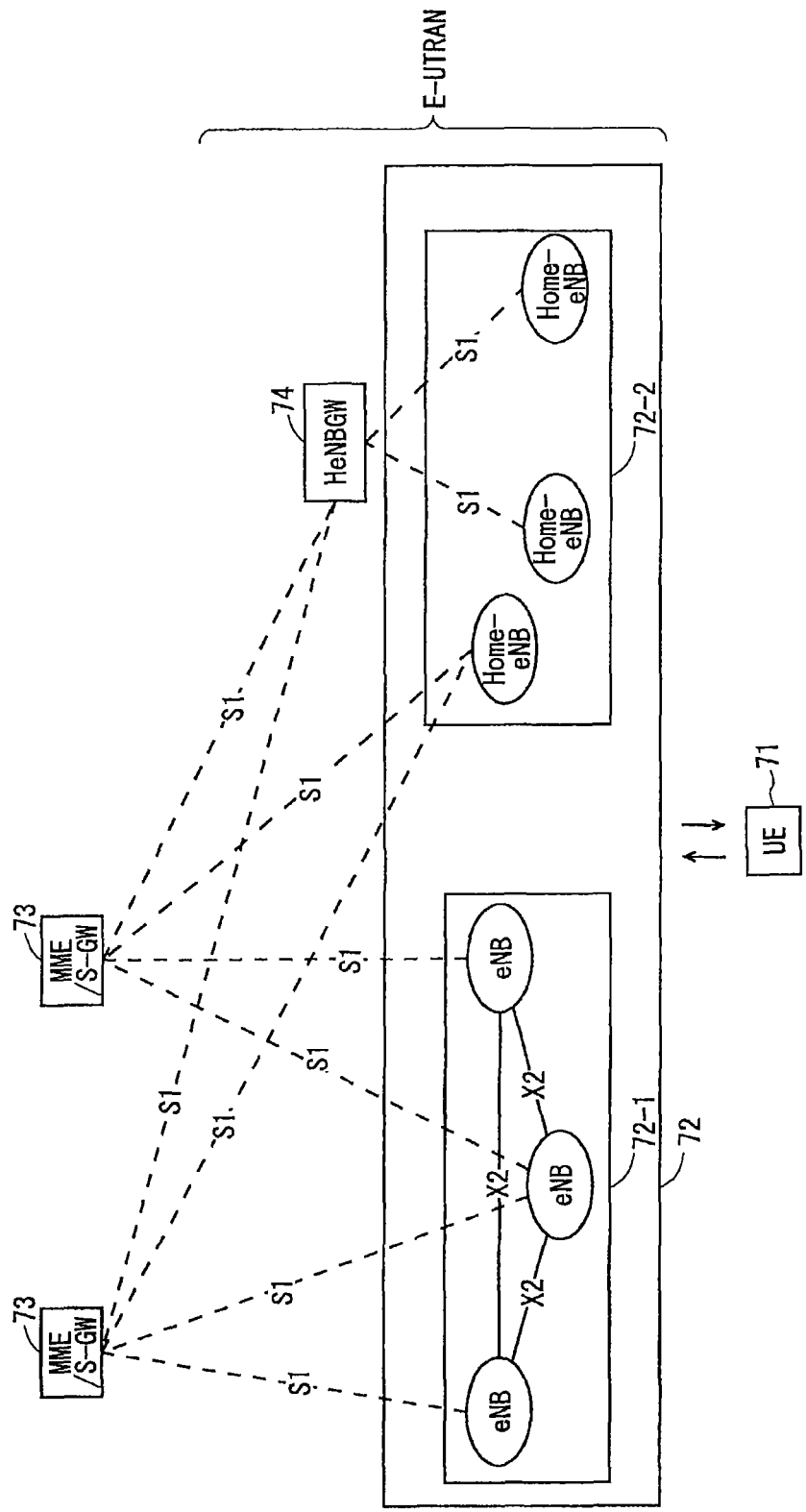
FIG. 7 is a block diagram showing the overall configuration of an LTE mobile communication system currently under discussion of 3GPP.

FIG. 7 is a block diagram showing an overall configuration of an LTE mobile communication system, which is currently under discussion of 3GPP. Currently, 3GPP is studying an overall system configuration including closed subscriber group (CSG) cells (Home-eNodeBs (Home-eNB; HeNB) of E-UTRAN, Home-NB (HNB) of UTRAN) and non-CSG cells (eNodeB (eNB) of E-UTRAN, NodeB (NB) of UTRAN, and BSS of GERAN) and, as to E-UTRAN, is proposing the configuration as shown in FIG. 7 (see Chapter 4.6.1 of Non-Patent Document 1).

FIG. 7 is described. A user equipment device (hereinafter, referred to as "user equipment" or "UE") 71 is capable of performing radio communication with a base station device (hereinafter, referred to as "base station") 72 and transmits/receives signals through radio communication. The base stations 72 are classified into an eNB 72-1 and a Home-eNB 72-2. The eNB 72-1 is connected to an MME/S-GW unit (hereinafter, referred to as an "MME unit") 73 including an MME, S-GW or MME and S-GW through an S1 interface, and control information is communicated between the eNB 72-1 and the MME unit 73. A plurality of MME units 73 may be connected to one eNB 72-1. The eNBs 72-1 are connected to each other by means of an X2 interface, and control information is communicated between the eNBs 72-1.

The Home-eNB 72-2 is connected to the MME unit 73 by means of the S1 interface, and control information is communicated between the Home-eNB 72-2 and the MME unit 73. A plurality of Home-eNBs 72-2 are connected to one MME unit 73. While, the Home-eNBs 72-2 are connected to the MME units 73 through a Home-eNB Gateway (HeNBGW) 74. The Home-eNBs 72-2 are connected to the HeNBGW 74 by means of the S1 interface, and the HeNBGW 74 is connected to the MME units 73 through an S1 interface. One or a plurality of Home-eNBs 72-2 are connected to one HeNBGW 74, and information is communicated therebetween through an S1 interface. The HeNBGW 74 is connected to one or a plurality of MME units 73, and information is communicated therebetween through an S1 interface.

Further, 3GPP is currently studying the configuration below. The X2 interface between the Home-eNBs 72-2 is not supported. The HeNBGW 74 appears to the MME unit 73 as the eNB 72-1. The HeNBGW 74 appears to the Home-eNB 72-2 as the MME unit 73. The interfaces between the Home-eNBs 72-2 and the MME units 73 are the same, which are the S1 interfaces, irrespective of whether or not the Home-eNB 72-2 is connected to the MME unit 73 through the HeNBGW 74. The mobility to the Home-eNB 72-2 or the mobility from the Home-eNB 72-2 that spans the plurality of MME units 73 is not supported. The Home-eNB 72-2 supports a single cell.

Figure 8:
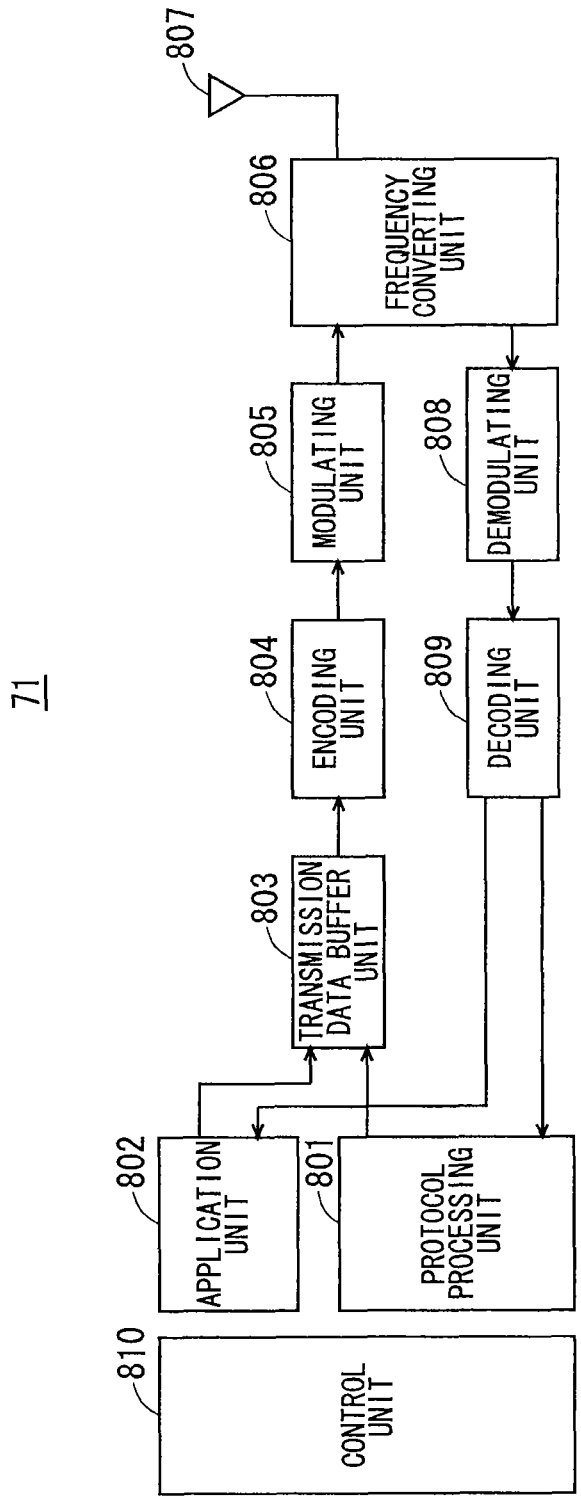
FIG. 8 is a block diagram showing the configuration of a user equipment (user equipment 71 of FIG. 7) according to the present invention.

FIG. 8 is a block diagram showing the configuration of the user equipment (user equipment 71 of FIG. 7) according to the present invention. The transmission process of the user equipment 71 shown in FIG. 8 is described. First, a transmission data buffer unit 803 stores the control data from a protocol processing unit 801 and the user data from an application unit 802. The data stored in the transmission data buffer unit 803 is transmitted to an encoding unit 804 and is subjected to encoding process such as error correction. There may exist the data output from the transmission data buffer unit 803 directly to a modulating unit 805 without encoding process. The data encoded by the encoding unit 804 is modulated by the modulating unit 805. The modulated data is output to a frequency converting unit 806 after being converted into a baseband signal, and then is converted into a radio transmission frequency. After that, a transmission signal is transmitted from an antenna 807 to the base station 72.

The user equipment 71 executes the reception process as follows. The antenna 807 receives the radio signal from the base station 72. The received signal is converted from a radio reception frequency to a baseband signal by the frequency converting unit 806 and is then demodulated by a demodulating unit 808. The demodulated data is transmitted to a decoding unit 809 and is subjected to decoding process such as error correction. Among the pieces of decoded data, the control data is transmitted to the protocol processing unit 801, while the user data is transmitted to the application unit 802. A series of process of the user equipment 71 is controlled by a control unit 810. This means that, though not shown in FIG. 8, the control unit 810 is connected to the respective units 801 to 809.

Figure 9:
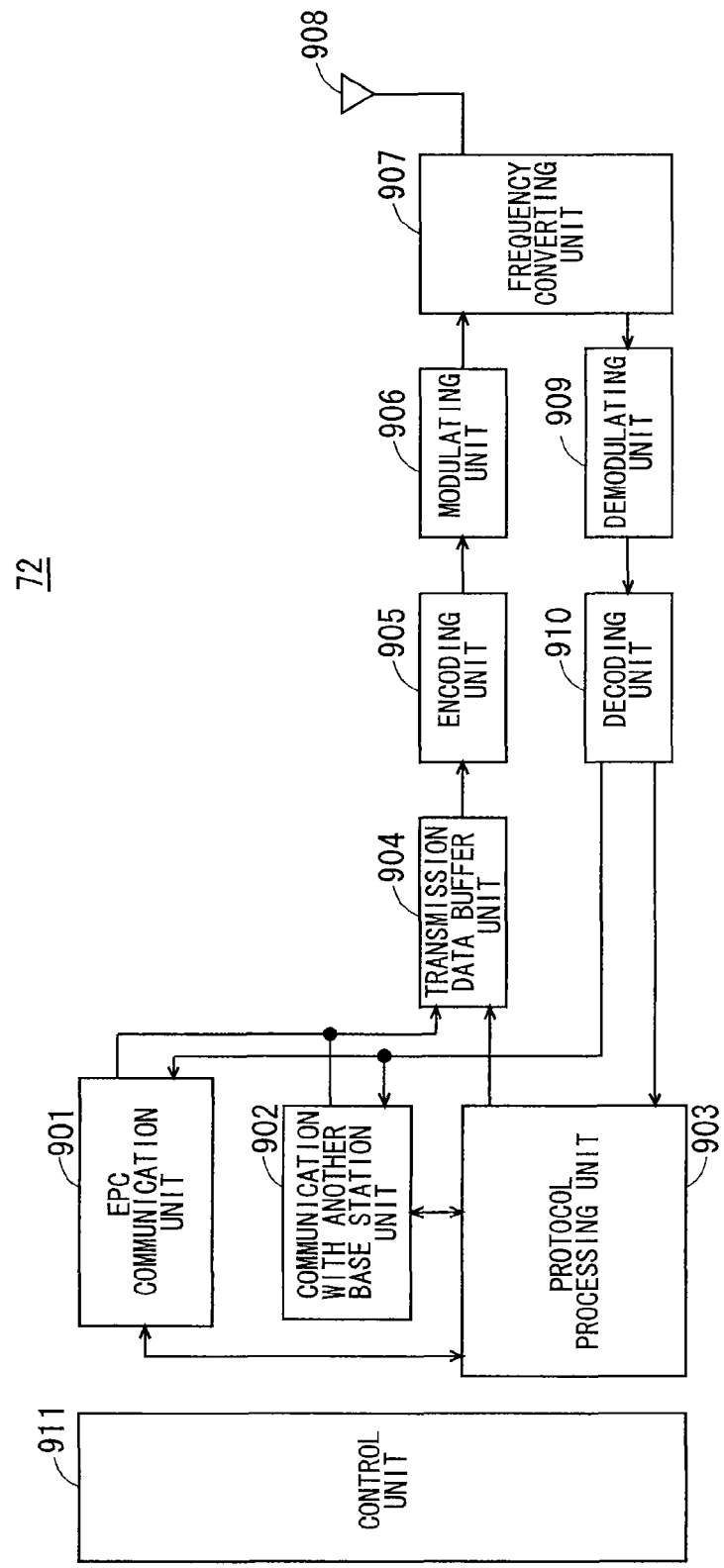
FIG. 9 is a block diagram showing the configuration of a base station (base station 72 of FIG. 7) according to the present invention.

FIG. 9 is a block diagram showing the configuration of the base station (base station 72 of FIG. 7) according to the present invention. The transmission process of the base station 72 shown in FIG. 9 is described. An EPC communication unit 901 performs data transmission/reception between the base station 72 and the EPCs (such as MME unit 73 and HeNBGW 74). A communication with another base station unit 902 performs data transmission/reception to/from another base station. The X2 interface between the Home-eNBs 72-2 is not intended to be supported, and accordingly, it is conceivable that the communication with another base station unit 902 may not exist in the Home-eNB 72-2. The EPC communication unit 901 and the communication with another base station unit 902 respectively transmit/receive information to/from a protocol processing unit 903. The control data from the protocol processing unit 903, and the user data and control data from the EPC communication unit 901 and the communication with another base station unit 902 are stored in a transmission data buffer unit 904.

The data stored in the transmission data buffer unit 904 is transmitted to an encoding unit 905 and is then subjected to encoding process such as error correction. There may exist the data output from the transmission data buffer unit 904 directly to a modulating unit 906 without encoding process. The encoded data is modulated by the modulating unit 906. The modulated data is output to a frequency converting unit 907 after being converted into a baseband signal, and is then converted into a radio transmission frequency. After that, a transmission signal is transmitted from an antenna 908 to one or a plurality of user equipments 71.

While, the reception process of the base station 72 is executed as follows. A radio signal from one or a plurality of user equipments 71 is received by the antenna 908. The received signal is converted from a radio reception frequency into a baseband signal by the frequency converting unit 907, and is then demodulated by a demodulating unit 909. The demodulated data is transmitted to a decoding unit 910 and is then subjected to decoding process such as error correction. Among the pieces of decoded data, the control data is transmitted to the protocol processing unit 903, EPC communication unit 901, or communication with another base station unit 902, while the user data is transmitted to the EPC communication unit 901 and communication with another base station unit 902. A series of process by the base station 72 is controlled by a control unit 911. This means that, though not shown in FIG. 9, the control unit 911 is connected to the respective units 901 to 910.

The functions of the Home-eNB 72-2 currently under discussion of 3GPP are described below (see Chapter 4.6.2 of Non-Patent Document 1). The Home-eNB 72-2 has the same function as that of the eNB 72-1. In addition, the Home-eNB 72-2 has the function of discovering a suitable serving HeNBGW 74 in a case of connection to the HeNBGW 74. The Home-eNB 72-2 is connected only to one HeNBGW 74. That is, in a case of the connection to the HeNBGW 74, the Home-eNB 72-2 does not use the Flex function in the S1 interface. When the Home-eNB 72-2 is connected to one HeNBGW 74, it is not simultaneously connected to another HeNBGW 74 or another MME unit 73.

The TAC and PLMN ID of the Home-eNB 72-2 are supported by the HeNBGW 74. When the Home-eNB 72-2 is connected to the HeNBGW 74, selection of the MME unit 73 at "UE attachment" is performed by the HeNBGW 74 instead of the Home-eNB 72-2. The Home-eNB 72-2 may be deployed without network planning. In this case, the Home-eNB 72-2 is moved from one geographical area to another geographical area. Accordingly, the Home-eNB 72-2 in this case is required to be connected to a different HeNBGW 74 depending on its location.

Figure 10:
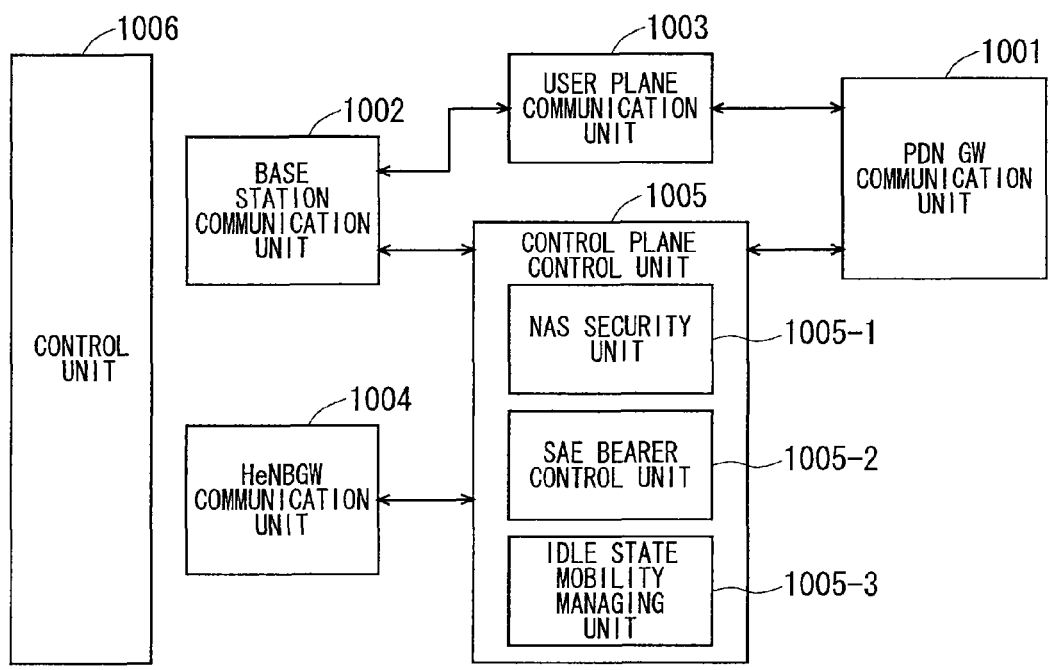
FIG. 10 is a block diagram showing the configuration of an MME (MME unit 73 of FIG. 7) according to the present invention.

FIG. 10 is a block diagram showing the configuration of the MME (MME unit 73 of FIG. 7) according to the present invention. A PDN GW communication unit 1001 performs data transmission/reception between the MME unit 73 and a PDN GW. A base station communication unit 1002 performs data transmission/reception between the MME unit 73 and the base station 72 by means of the S1 interface. In the case where the data received from the PDN GW is user data, the user data is transmitted from the PDN GW communication unit 1001 to the base station communication unit 1002 through a user plane communication unit 1003 and is then transmitted to one or a plurality of base stations 72. In the case where the data received from the base station 72 is user data, the user data is transmitted from the base station communication unit 1002 to the PDN GW communication unit 1001 through the user plane communication unit 1003 and is then transmitted to the PDN GW.

In the case where the data received from the PDN GW is control data, the control data is transmitted from the PDN GW communication unit 1001 to a control plane control unit 1005. In the case where the data received from the base station 72 is control data, the control data is transmitted from the base station communication unit 1002 to the control plane control unit 1005.

A HeNBGW communication unit 1004 is provided in the case where the HeNBGW 74 is provided, which performs data transmission/reception by means of the interface (IF) between the MME unit 73 and the HeNBGW 74 according to an information type. The control data received from the HeNBGW communication unit 1004 is transmitted from the HeNBGW communication unit 1004 to the control plane control unit 1005. The processing results of the control plane control unit 1005 are transmitted to the PDN GW through the PDN GW communication unit 1001. The processing results of the control plane control unit 1005 are transmitted to one or a plurality of base stations 72 by means of the S1 interface through the base station communication unit 1002, and are transmitted to one or a plurality of HeNBGWs 74 through the HeNBGW communication unit 1004.

The control plane control unit 1005 includes a NAS security unit 1005-1, an SAE bearer control unit 1005-2 and an idle state mobility managing unit 1005-3, and performs overall process for the control plane. The NAS security unit 1005-1 provides, for example, security of a non-access stratum (NAS) message. The SAE bearer control unit 1005-2 manages, for example, a system architecture evolution (SAE) bearer. The idle state mobility managing unit 1005-3 performs, for example, mobility management of an idle state (LTE-IDLE state, which is merely referred to as idle as well), generation and control of paging signal in an idle state, addition, deletion, update and search of a tracking area (TA) of one or a plurality of user equipments 71 being served thereby, and TA list management.

The MME unit 73 begins a paging protocol by transmitting a paging message to the cell belonging to a tracking area (TA) in which the UE is registered. The idle state mobility managing unit 1005-3 may manage the CSG of the Home-eNBs 72-2 to be connected to the MME unit 73, CSG-IDs and a whitelist.

In the CSG-ID management, the relationship between a user equipment corresponding to the CSG-ID and the CSG cell is managed (added, deleted, updated or searched). For example, it may be the relationship between one or a plurality of user equipments whose user access registration has been performed with a CSG-ID and the CSG cells belonging to this CSG-ID. In the whitelist management, the relationship between the user equipment and the CSG-ID is managed (added, deleted, updated or searched). For example, one or a plurality of CSG-IDs with which user registration has been performed by a user equipment may be stored in the whitelist. The above-mentioned management related to the CSG may be performed by another part of the MME unit 73. A series of process by the MME unit 73 is controlled by a control unit 1006. This means that, though not shown in FIG. 10, the control unit 1006 is connected to the respective units 1001 to 1005.

The function of the MME currently under discussion of 3GPP is described below (see Chapter 4.6.2 of Non-Patent Document 1). The MME performs access control for one or a plurality of user equipments being members of closed subscriber groups (CSGs). The MME recognizes the execution of paging optimization as an option.

FIG. 11 is a block diagram showing the configuration of the HeNBGW 74 shown in FIG. 7 that is a HeNBGW according to the present invention. An EPC communication unit 1101 performs data transmission/reception between the HeNBGW 74 and the MME unit 73 by means of the S1 interface. A base station communication unit 1102 performs data transmission/reception between the HeNBGW 74 and the Home-eNB 72-2 by means of the S1 interface. A location processing unit 1103 performs the process of transmitting, to a plurality of Home-eNBs 72-2, the registration information or the like among the data transmitted from the MME unit 73 through the EPC communication unit 1101. The data processed by the location processing unit 1103 is transmitted to the base station communication unit 1102 and is transmitted to one or a plurality of Home-eNBs 72-2 through the S1 interface.

The data only caused to pass through (to be transparent) without requiring the process by the location processing unit 1103 is passed from the EPC communication unit 1101 to the base station communication unit 1102, and is transmitted to one or a plurality of Home-eNBs 72-2 through the S1 interface. A series of process by the HeNBGW 74 is controlled by a control unit 1104. This means that, though not shown in FIG. 11, the control unit 1104 is connected to the respective units 1101 to 1103.

The function of the HeNBGW 74 currently under discussion of 3GPP is described below (see Chapter 4.6.2 of Non-Patent Document 1). The HeNBGW 74 relays an S1 application. The HeNBGW 74 terminates the S1 application that is not associated with the user equipment 71 though it is a part of the procedures toward the Home-eNB 72-2 and towards the MME unit 73. When the HeNBGW 74 is deployed, the procedure that is not associated with the user equipment 71 is communicated between the Home-eNB 72-2 and the HeNBGW 74 and between the HeNBGW 74 and the MME unit 73. The X2 interface is not set between the HeNBGW 74 and another node. The HeNBGW 74 recognizes the execution of paging optimization as an option.

Figure 12:
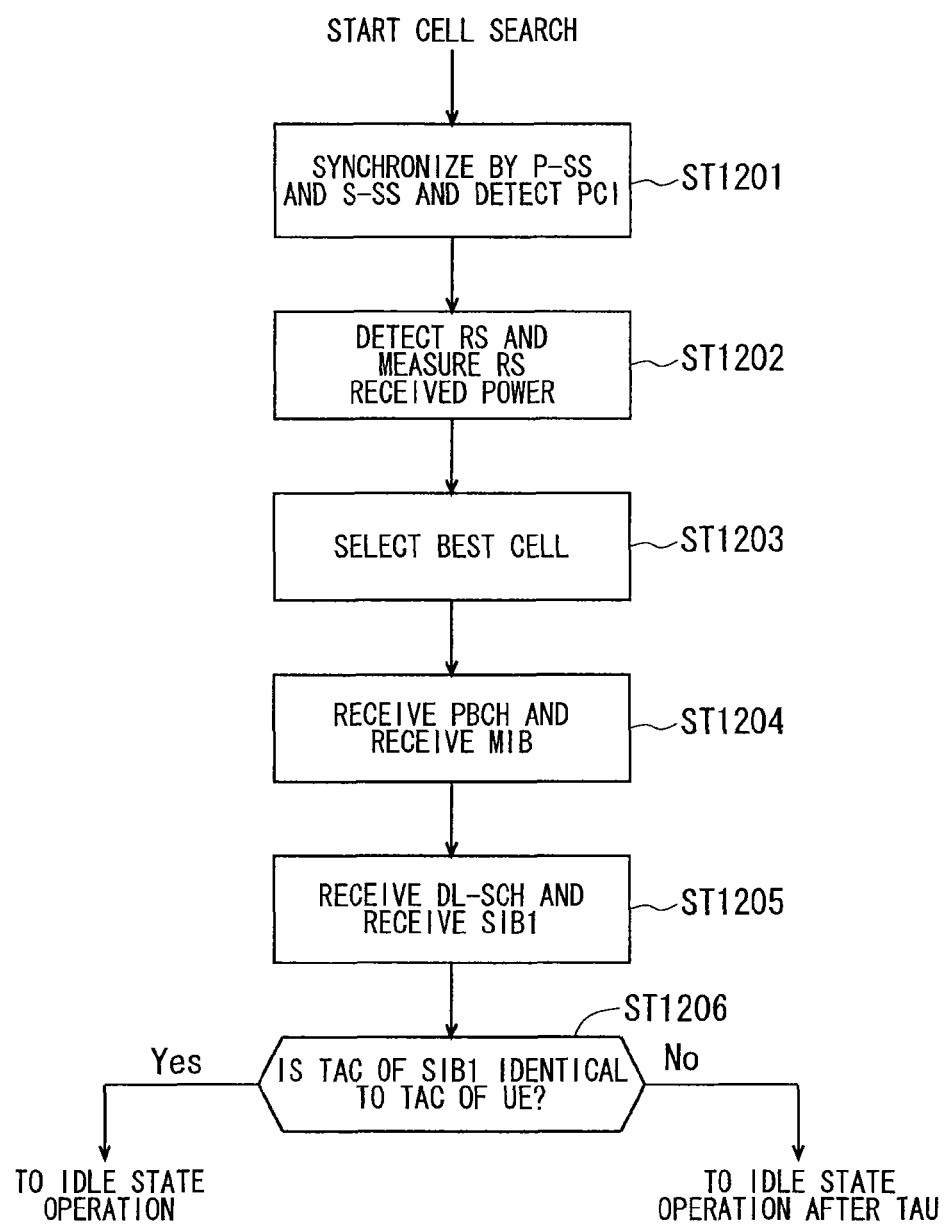
FIG. 12 is a flowchart showing an outline from a cell search to an idle state operation performed by a user equipment (UE) in the LTE communication system.

Next, an example of a typical cell search method in a mobile communication system is described. FIG. 12 is a flowchart showing an outline from cell search to idle state operation performed by a user equipment (UE) in the LTE communication system. When the cell search is started by the user equipment, in Step ST1201, the slot timing and frame timing are synchronized by a primary synchronization signal (P-SS) and a secondary synchronization signal (S-SS) transmitted from a nearby base station. Synchronization codes, which correspond to physical cell identities (PCIs) assigned per cell one by one, are assigned to the synchronization signals (SS) including the P-SS and S-SS. The number of PCIs is currently studied in 504 ways, and these 504 ways are used for synchronization, and the PCIs of the synchronized cells are detected (specified).

Next, in Step ST1202, a reference signal RS of the synchronized cells, which is transmitted from the base station per cell, is detected and the received power is measured. The code corresponding to the PCI one by one is used for the reference signal RS, and separation from another cell is enabled by correlation using the code. The code for RS of the cell is derived from the PCI specified in Step ST1201, which makes it possible to detect the RS and measure the RS received power.

Next, in Step ST1203, the cell having the best RS reception quality (for example, cell having the highest RS received power; best cell) is selected from one or more cells that have been detected up to Step ST1202.

In Step ST1204, next, the PBCH of the best cell is received, and the BCCH that is the broadcast information is obtained. A master information block (MIB) containing the cell configuration information is mapped on the BCCH over the PBCH.

Accordingly, the MIB is obtained by obtaining the BCCH through reception of the PBCH. Examples of the MIB information include the downlink (DL) system bandwidth (also referred to as transmission bandwidth configuration (dl-bandwidth)), transmission antenna number and system frame number (SFN).

In Step ST1205, next, the DL-SCH of the cell is received based on the cell configuration information of the MIB, to thereby obtain a system information block (SIB) 1 of the broadcast information BCCH. The SIB1 contains the information related to the access to the cell, information related to cell selection and scheduling information of other SIB (SIBk; k is an integer equal to or larger than two). In addition, the SIB1 contains a tracking area code (TAC).

In Step ST1206, next, the user equipment compares the TAC of the SIB1 received in Step ST1205 with the TAC that has been already possessed by the user equipment. In a case where they are identical to each other as a result of comparison, the user equipment enters an idle state operation in the cell. In a case where they are different from each other as a result of comparison, the user equipment requires a core network (EPC) (including MME and the like) to change a TA through the cell for performing tracking area update (TAU). The core network updates the TA based on an identification number (such as a UE-ID) of the user equipment transmitted from the user equipment together with a TAU request signal. The core network updates the TA, and then transmits the TAU received signal to the user equipment. The user equipment rewrites (updates) the TAC (or TAC list) of the user equipment with the TAC of the cell. After that, the user equipment enters the idle state operation in the cell.

In the LTE and universal mobile telecommunication system (UMTS), the introduction of a closed subscriber group (CSG) cell is studied. As described above, access is allowed for only one or a plurality of user equipments registered with the CSG cell. The CSG cell and one or a plurality of user equipments that have been registered constitute one CSG. A specific identification number referred to as CSG-ID is added to the thus constituted CSG. Note that one CSG may contain a plurality of CSG cells. After being registered with any one of the CSG cells, the user equipment can access another CSG cell of the CSG to which the registered CSG cell belongs.

Alternatively, the Home-eNB in the LTE or the Home-NB in the UMTS is used as the CSG cell in some cases. The user equipment registered with the CSG cell has a whitelist. Specifically, the whitelist is stored in the subscriber identity module (SIM)/USIM. The CSG information of the CSG cell with which the user equipment has been registered is stored in the whitelist. Specific examples of the CSG information include CSG-ID, tracking area identity (TAI) and TAC. Any one of the CSG-ID and TAC is adequate as long as they are associated with each other. Alternatively, GCI is adequate as long as the CSG-ID, TAC and global cell identity (GCI) are associated with each other.

As can be seen from the above, the user equipment that does not have a whitelist (including a case where the whitelist is empty in the present invention) is not allowed to access the CSG cell but is allowed to access the non-CSG cell only. On the other hand, the user equipment which has a whitelist is allowed to access the CSG cell of the CSG-ID with which registration has been performed as well as the non-CSG cell.

3GPP discusses that all physical cell identities (PCIs) are split (referred to as PCI-split) into ones reserved for CSG cells and the others reserved for non-CSG cells (see Non-Patent Document 5). Further, 3GPP discusses that the PCI split information is broadcast in the system information from the base station to the user equipments being served thereby. Non-Patent Document 5 discloses the basic operation of a user equipment by PCI split. The user equipment that does not have the PCI split information needs to perform cell search using all PCIs (for example, using all 504 codes). On the other hand, the user equipment that has the PCI split information is capable of performing cell search using the PCI split information.

Further, 3GPP has determined that the PCIs for hybrid cells are not contained in the PCI range for CSG cells (see Chapter 10.7 of Non-Patent Document 1).

The HeNB and HNB are required to support various types of service. For example, an operator causes the predetermined HeNB and HNB to register user equipments therein and permits only the registered user equipments to access the cells of the HeNB and HNB, so that the user equipments increase the available radio resources for performing high-speed communication. In such service, the operator sets a higher accounting fee compared with normal service.

In order to achieve the above-mentioned service, the closed subscriber group (CSG) cell accessible only to the registered (subscribed or member) user equipments is introduced. It is required to install a large number of closed subscriber group (CSG) cells in shopping malls, apartment buildings, schools, companies and the like. For example, the CSG cells are required to be installed for each store in shopping malls, for each room in apartment buildings, for each classroom in schools, and for each section in companies in such a manner that only the users who have registered with the respective CSG cells are permitted to use those CSG cells. The HeNB/HNB is required not only to complement the communication outside the coverage of the macro cell but also to support various types of service as described above. This leads to a case where the HeNB/HNB is installed within the coverage of the macro cell.

As one of the techniques to be studied in LTE-A, heterogeneous networks (HetNets) are added. 3GPP handles low-output-power network nodes in a local-area range (local area range nodes, local area nodes and local nodes), such as pico eNB (pico cell), node for hotzone cells, HeNB/HNB/CSG cell, relay node and remote radio head (RRH). Accordingly, it is required to deploy networks in which one or more of the above-mentioned local area range nodes are incorporated. The networks in which one or more of the above-mentioned local area range nodes are incorporated in a normal eNB (macro cell) are referred to as heterogeneous networks, where the interference reduction method, capacity enhancement method and the like are studied.

3GPP is pursuing specifications standard of long term evolution advanced (LTE-A) as Release 10 (see Non-Patent Document 6 and Non-Patent Document 7).

As to the LTE-A system, it is discussed that a relay (relay node (RN)) is supported for achieving a high communication rate, high cell-edge throughput, new coverage area or the like.

The following has been decided regarding the relay node. The relay node is described with reference to FIG. 13. FIG. 13 is a diagram illustrating a relay node disclosed in Non-Patent Document 7. A relay node 1302 is connected to a donor cell (Donor eNB; DeNB) 1301 via a link 1305. The link 1305 is referred to as a backhaul link. The donor cell 1301 has a user equipment 1304 being served thereby. The donor cell 1301 is connected to the user equipment 1304 via a link 1307. The link 1307 is referred to as a direct link. The link 1305 and the link 1307 share the same frequency band within the range of the donor cell 1301. Further, it is also possible to connect the user equipment 1304 supporting the Release 8 specifications of 3GPP to the donor cell 1301. The relay node 1302 has a user equipment 1303 being served thereby. The relay node 1302 is connected to the user equipment 1303 via a link 1306. The link 1306 is referred to as an access link.

As the method of multiplexing backhaul links in FDD, the transmission from the donor cell 1301 to the relay node 1302 is performed in the downlink (DL) frequency band, whereas the transmission from the relay node 1302 to the donor cell 1301 is performed in the uplink (UL) frequency band. As the method of partitioning the resource at the relay node 1302, the link 1305 from the donor cell 1301 to the relay node 1302 and the link 1306 from the relay node 1302 to the user equipment 1303 are time division multiplexed in a single carrier frequency, and the link 1305 from the relay node 1302 to the donor cell 1301 and the link 1306 from the user equipment 1303 to the relay node 1302 are time division multiplexed in a single carrier frequency as well. This prevents the transmission of the relay from causing interference to the reception of its own relay in the relay.

Further, Non-Patent Document 8 discloses that a problem described below occurs in the decisions as to the relay nodes by 3GPP. In a conventional technique, for preventing the transmission of a relay node from causing interference to the reception of its own relay node, the link from a donor cell to a relay node and the link from a relay node to a user equipment being served by the relay node are time division multiplexed in a single frequency band, and the link from a relay node to a donor cell and the link from a user equipment being served by a relay node to the relay node are time division multiplexed in a single frequency band as well. The interference caused by the transmission of a relay node to the reception of its own relay node is also referred to as self-interference in some cases. The time division multiplexing decreases a throughput, leading to a problem that the system performance degrades.

A solution disclosed in Non-Patent Document 8 is described below. In the solution disclosed in Non-Patent Document 8, the access link and backhaul link are operated in different carrier frequencies or different frequency bands. A specific method for the solution disclosed in Non-Patent Document 8 is described with reference to FIG. 14. FIG. 14 is a diagram illustrating a relay node disclosed in Non-Patent Document 8. The portions of FIG. 14 corresponding to those of FIG. 13 are denoted by the same reference numerals, which are not described.

First, part (a) of FIG. 14 is described. In the direct link 1307, a frequency band A is used. In the backhaul link 1305, the frequency band A is used. In the access link 1306, among the carrier frequencies of the frequency band A, a carrier frequency different from the carrier frequency used in the backhaul link 1305 is used. In this manner, the configuration is made such that the carrier frequency differs between the access link and backhaul link.

Next, part (b) of FIG. 14 is described. In the direct link 1307, the frequency band A is used. In the backhaul link 1305, the frequency band A is used. In the access link 1306, a frequency band B is used. In this manner, the configuration is made such that the frequency band differs between the access link and backhaul link.

Then, part (c) of FIG. 14 is described. In the direct link 1307, the frequency band A is used. In the backhaul link

1305, the frequency band B is used. In the access link 1306, among the carrier frequencies of the frequency band B, a carrier frequency different from the carrier frequency used in the backhaul link 1305 is used. In this manner, the configuration is made such that the carrier frequency differs between the access link and backhaul link.

Then, part (d) of FIG. 14 is described. In the direct link 1307, the frequency band A is used. In the backhaul link 1305, the frequency band B is used. In the access link 1306, among the carrier frequencies of the frequency band A, a carrier frequency different from the carrier frequency used in the backhaul link 1305 is used. In this manner, the configuration is made such that the frequency band differs between the access link and backhaul link.

Next, part (e) of FIG. 14 is described. In the direct link 1307, the frequency band A is used. In the backhaul link 1305, the frequency band B is used. In the access link 1306, a frequency band C is used. In this manner, the configuration is made such that the frequency band differs between the access link and backhaul link.

As a result of the use of different carrier frequencies or different frequency bands between in the case where a donor cell schedules backhaul and in the case where a relay node schedules an access link as described above, it is not required to use time division multiplexing. Accordingly, the improvement of a throughput is aimed in the technique disclosed in Non-Patent Document 8.

However, a problem described below occurs even in a case of using the technique disclosed in Non-Patent Document 8. In the direct link and access link, the load of a user equipment in a search operation increases due to different carrier frequencies. This causes a control delay of a user equipment, leading to a problem that power consumption increases.

Figure 15:
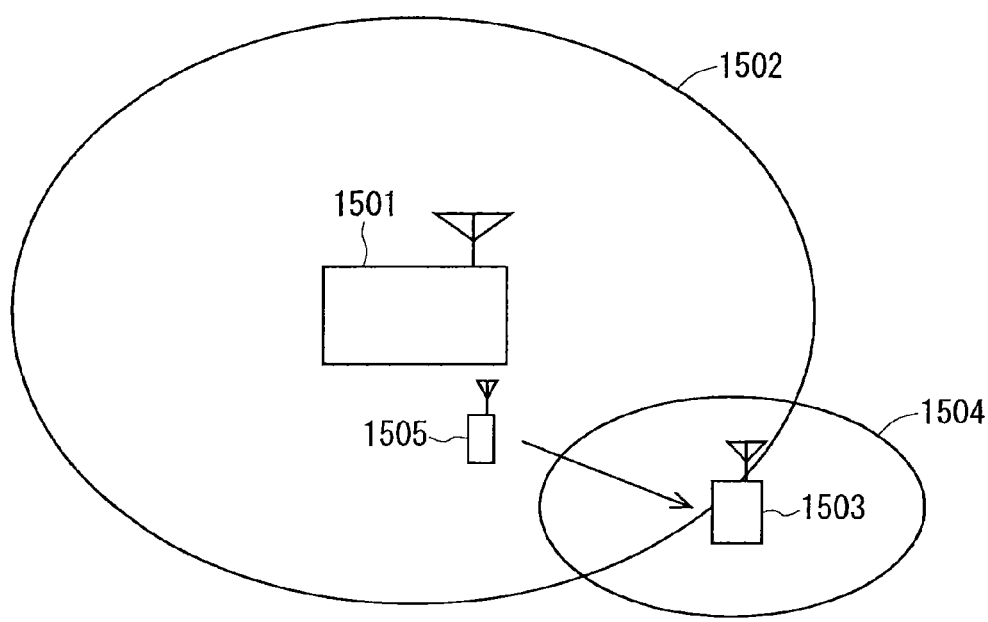
FIG. 15 is a location diagram illustrating a problem of Non-Patent Document 8.

A specific example in which the above-mentioned problem occurs is described with reference to FIG. 15. FIG. 15 is a location diagram illustrating a problem of Non-Patent Document 8. A donor cell 1501 has a coverage 1502. A relay node 1503 is installed in the vicinity of a cell edge of the donor cell 1501. The relay node 1503 has a coverage 1504. A user equipment 1505 in an idle state is present in the coverage of the donor cell. Considered here is the case where the user equipment 1505 moves from the vicinity of the donor cell 1501 to the vicinity of the relay node 1503. Upon the moving, the user equipment 1505 performs cell reselection to the relay node 1503 based on the measurement results of neighboring cells. The outline of a cell search operation is as shown in FIG. 12.

In the technique disclosed in Non-Patent Document 8, the carrier frequency differs between the direct link and access link, and accordingly in FIG. 15, cell reselection to the relay node 1503 cannot be achieved if the cell search operation is not performed in a carrier frequency different from the carrier frequency of the donor cell 1501 being a serving cell. The user equipment 1505 is not able to ascertain the carrier frequency used by the relay node 1503 in the access link. As described above, a problem that the load of a user equipment in a search operation increases occurs in the technique of Non-Patent Document 8.

In specific method for the solution described in part (c) of FIG. 14, part (d) of FIG. 14 and part (e) of FIG. 14, three different carrier frequencies are required for installing a relay node. This causes a problem that the frequency use efficiency decreases in a mobile communication system.

Therefore, in the present embodiment, the access link and direct link are configured to use the same frequency band, same carrier, same component carrier or same frequency layer. This eliminates the need for a search operation in a different frequency band, different carrier, different component carrier or different frequency layer, leading to an effect that the load of a user equipment in a search operation is reduced.

Further, in the present embodiment, only the backhaul link is configured to use a different frequency band, different carrier, different component carrier or different frequency layer. This achieves an effect that self-interference of a relay node is prevented.

The frequency band is described below. The systems such as UMTS terrestrial radio access (UTRA), LTE and LTE-A are designed such that an operation is made in a frequency band (merely referred to as band in some cases) consisting of several successive frequencies in the uplink as well as downlink. Each frequency band as described above is referred to as a frequency band or operating band at times.

The component carrier is described below (see Chapter 5 of Non-Patent Document 6). A user equipment supporting LTE-A is considered to have the capability for carrier aggregation to simultaneously receive and transmit on a plurality of component carriers, only receive on those or only transmit on those.

Figure 16:
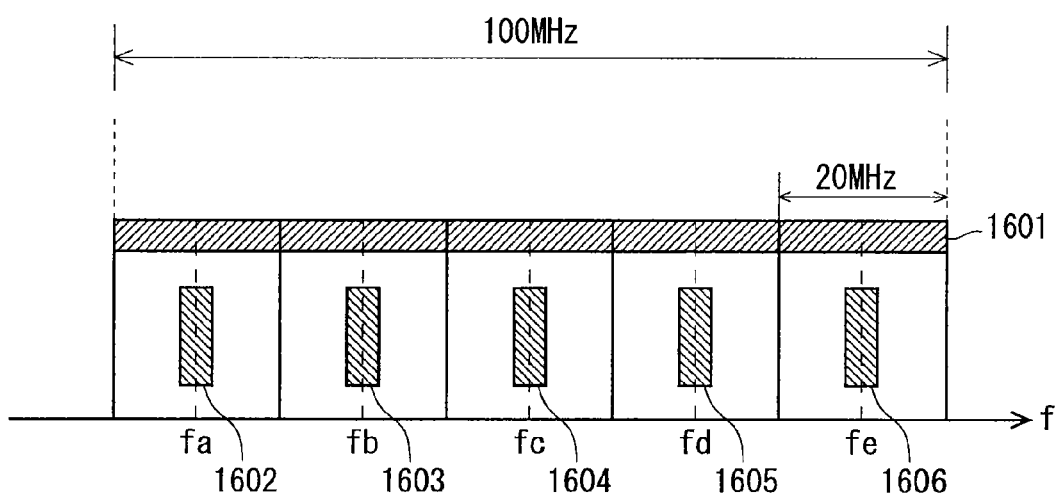
FIG. 16 is a conceptual diagram of the configuration of a frequency band of an LTE-A system.

FIG. 16 is a conceptual diagram of the configuration of a frequency band of the LTE-A system. In FIG. 16, a reference numeral 1601 denotes a physical downlink control channel (PDCCH). FIG. 16 shows an example in which a physical downlink control channel is mapped for each of all component carriers, which is not limited thereto. As another example, it is conceivable that the component carrier to which a physical downlink control channel is mapped and a component carrier to which a physical downlink control channel is not mapped may coexist.

In FIG. 16, reference numerals 1602, 1603, 1604, 1605 and 1606 denote a downlink synchronization signal (SS) and a physical broadcast channel (PBCH). FIG. 16 shows the example in which the downlink synchronization signal and physical broadcast channel (or broadcast information) are mapped per component carrier, which is not limited thereto. As another example, it is conceivable that a component carrier to which a downlink synchronization signal and a physical broadcast channel are mapped and a component carrier to which a downlink synchronization signal and a physical broadcast channel are not mapped may coexist.

A base station having the bandwidth of 20 MHz as a component carrier and including five such component carriers in an LTE-A system is considered with reference to FIG. 16. The carrier frequencies of the respective component carriers are fa, fb, fc, fd and fe. That is, considered here is a base station having a downlink transmission bandwidth of 100 MHz. The bandwidth of a component carrier is not limited to 20 MHz, and 3GPP is discussing the bandwidth of 20 MHz or smaller at a meeting. In addition, the bandwidth of a component carrier supported by one base station is not limited to one type. The downlink transmission bandwidth of a base station in the LTE-A system is not limited to 100 MHz, and 3GPP is discussing the bandwidth of 100 MHz or smaller at a meeting. FIG. 16 shows the case of the successive component carriers, which is not limited thereto, and carrier aggregation is enabled by a receiver even in the case of non-successive component carriers.

Figure 17:
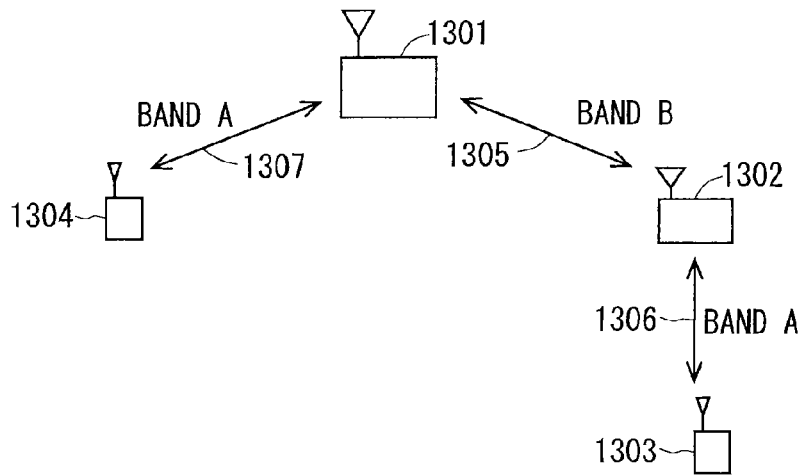
FIG. 17 is a diagram illustrating a relay node in a case where a solution of a first embodiment is used.

An example of a specific method for a solution of the first embodiment is described with reference to FIG. 17. FIG. 17 is a diagram illustrating a relay node in a case where the solution of the first embodiment is used. The portions of FIG. 17 corresponding to those of FIG. 13 are denoted by the same reference numerals, which are not described. In FIG.

17, the donor cell 1301 corresponds to a base station device, the relay node 1302 corresponds to a relay device, and the user equipments 1303 and 1304 correspond to user equipment devices. The mobile communication system includes the donor cell 1301, relay node 1302, and user equipments 1303 and 1304.

In the present embodiment, each of carriers having the same frequency is used in the direct link 1307 and the access link 1306, and a carrier having a different frequency from that of the carrier used in the direct link 1307 and the access link 1306 is used in the backhaul link 1305. The frequency of the carrier used in the direct link, access link and backhaul link may be set on a frequency band, component carrier or frequency layer basis.

For example, the frequency band A is used in the direct link 1307. The frequency band B is used in the backhaul link 1305. The same frequency band A as that of the direct link 1307 is used in the access link 1306. In this manner, the configuration is made such that the same frequency band is used in the access link and direct link and a different frequency band is used only in the backhaul link.

3GPP is discussing the self organized network (SON) for allowing automatic operation of a network. The present embodiment discloses the method of allowing automatic operation of a network below. A donor cell notifies the frequency information for a relay node. The donor cell may notify the frequency information for a relay node using a direct link, using a backhaul link, or using both of them. The notification of the frequency information for a relay node using a direct link allows a relay node to obtain the frequency information for a relay node even in a case where the relay node camps on the direct link in, for example, installation. The notification of the frequency information for a relay node using a backhaul link allows a relay node to obtain the frequency information for a relay node even in a case where the relay node camps on the backhaul link in, for example, installation.

Three specific examples of the frequency information for a relay node in a case where notification is made using a direct link are disclosed below.

(1) A frequency band, carrier or component carrier can be used in a backhaul link. Alternatively, it may be a frequency band, carrier or component carrier that is not used in a direct link.

(2) A frequency band, carrier or component carrier can be used in an access link. It may be a frequency band, carrier or component carrier used in a direct link. Alternatively, for example, by setting that the carrier having the same frequency as that of the direct link may be used in the access link, the information may be omitted. Accordingly, an effect that radio resources are effectively used is achieved.

(3) Both of (1) and (2) described above.

Four specific examples of the frequency information for a relay node in a case where notification is made using a backhaul link are disclosed below.

(1) Notification that the link is backhaul. Alternatively, notification that priority is given to backhaul in the link. The notification allows a user equipment being served by a donor cell to reselect another cell even in a case where the user equipment selects a backhaul link as the best cell in cell selection, cell reselection, handover or the like.

(2) A frequency band, carrier or component carrier used in a direct link.

(3) A frequency band, carrier or component carrier can be used in an access link.

Alternatively, for example, by setting that the carrier having the same frequency as that of the direct link may be used in the access uplink, the information may be omitted. Accordingly, an effect that radio resources are effectively used is achieved.

(4) Notification of the combination of (1), (2) and (3) described above.

Two specific examples of the method of notifying the frequency information for a relay node from a donor cell to a relay node are disclosed below. (1) Notification is made as the broadcast information. (2) Notification is made as the dedicated control information. In a case where notification is made as the dedicated control information, the donor cell and relay node perform, for example, RRC connection. The RRC connection may be performed upon a request from a relay node. The relay node may notify the donor cell of "indication for a relay node" using the RRC connection. After the notification, the donor cell may notify the relay node of the frequency information for a relay node.

Figure 18:
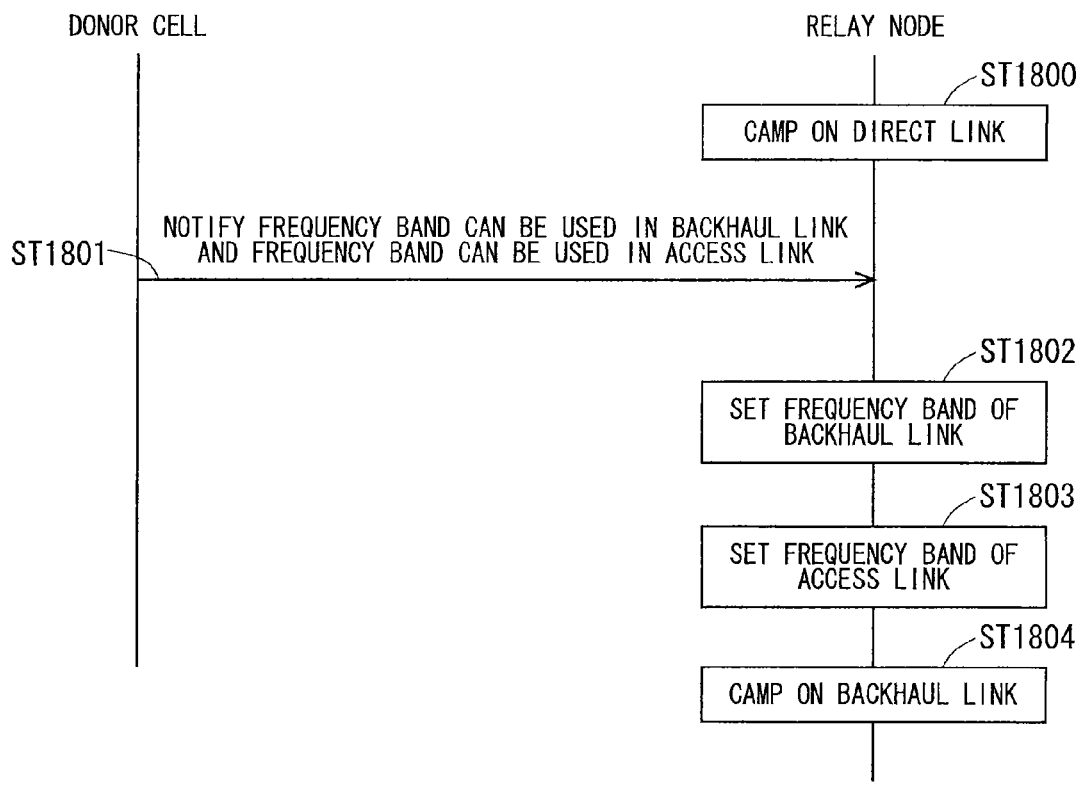
FIG. 18 is a diagram illustrating a sequence example of a mobile communication system in a case where the solution of the first embodiment is used.

Next, a sequence example of a mobile communication system in a case of using the solution of the first embodiment is described with reference to FIG. 17 and FIG. 18. FIG. 17 has been described above, which is not described here. FIG. 18 is a diagram illustrating a sequence example of a mobile communication system in a case of using the solution of the first embodiment and also in the case where the relay node performs cell selection to the direct link (band A in the example of FIG. 17) in, for example, installation. In Step ST1800, the relay node 1302 performs cell selection to the direct link 1307 of the donor cell 1301. That is, the relay node 1302 camps on the direct link. In Step ST1801, the donor cell 1301 notifies the relay node 1302 being served thereby of the frequency band can be used in the backhaul link 1305 and the frequency band can be used in the access link 1306 using the direct link 1307.

In Step ST1802, the relay node 1302 sets the frequency band of the backhaul link 1305 as the frequency band can be used in the backhaul link 1305 that has been received in Step ST1801. In a case where a plurality of frequency bands have been received in Step ST1801, the relay node 1302 selects one from the plurality of frequency bands and sets the selected one.

In Step ST1803, the relay node 1302 sets the frequency band of the access link 1306 as the frequency band can be used in the access link 1306 that has been received in Step ST1801. In a case where a plurality of frequency bands have been received in Step ST1801, the relay node 1302 selects one from the plurality of frequency bands and sets the selected one.

In Step ST1804, the relay node 1302 re-camps on the backhaul link 1305 (performs cell reselection) using the frequency band can be used in the backhaul link that has been received in Step ST1801.

The first embodiment achieves the effects below. The frequency of a carrier to be used, specifically, frequency band, carrier, component carrier or frequency layer is the same between the access link 1306 and the direct link 1307, and accordingly the search operation of a user equipment is simplified. This reduces the load of a user equipment, which contributes to lower power consumption.

The frequency of a carrier to be used differs between the backhaul link 1305 and the access link 1306, specifically, a different frequency band or the like is used therebetween, and accordingly self-interference of the relay node 1302 is reduced.

Therefore, in the present embodiment, it is possible to prevent the interference in a mobile communication system as well as reduce the load of a user equipment in the search operation.

Further, the installation of the relay node 1302 requires only two different carriers, which improves the frequency use efficiency.

First Modification of First Embodiment

A first modification of the first embodiment is described. In the first embodiment described above, the same frequency band or the like is used in the uplink (direct link) from a user equipment being served by a donor cell and the uplink (access link) from a user equipment being served by a relay node, and accordingly, uplink interference occurs in the coverage of the donor cell at times. Uplink scheduling is performed by the serving cell. That is, the donor cell and relay node individually perform uplink scheduling on user equipments being served thereby. Accordingly, for reducing the uplink interference through uplink scheduling, a control delay increases and a mobile communication system is complicated as well.

Figure 19:
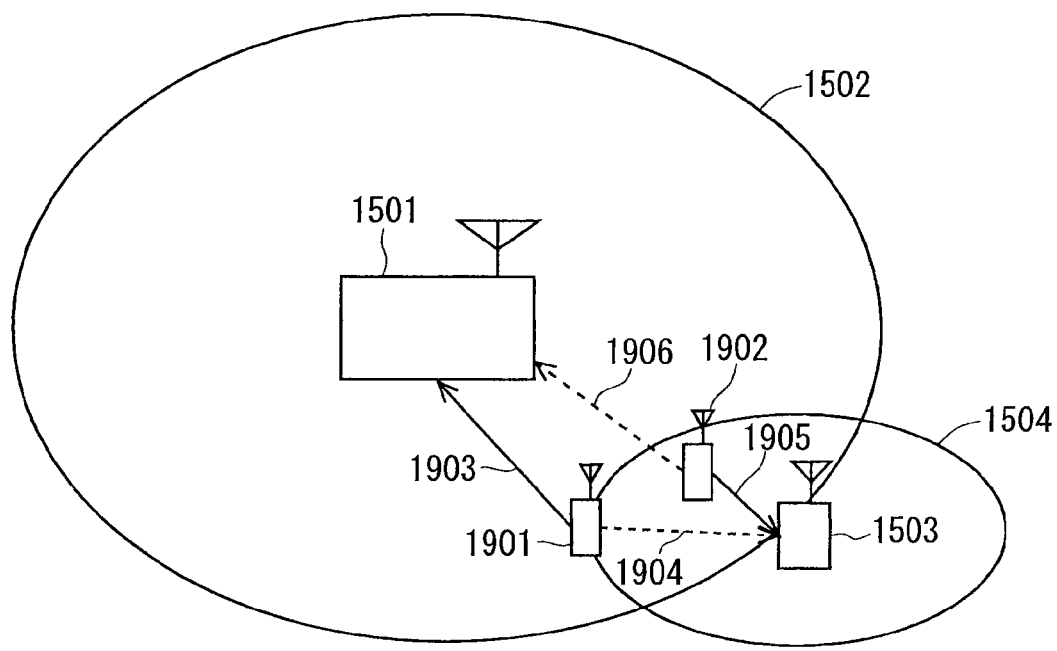
FIG. 19 is a location diagram for illustrating uplink interference.

The uplink interference is described with reference to FIG. 19. FIG. 19 is a location diagram for illustrating the uplink interference. The portions of FIG. 19 corresponding to those of FIG. 15 are denoted by the same reference numerals, which are not described. A user equipment 1901 is located in the vicinity of the cell edge of the relay node 1503 and is also located in the coverage 1502 of the donor cell 1501. The user equipment 1901 performs transmission/reception with the donor cell 1501. Another user equipment 1902 is located in the coverage 1504 of the relay node 1503 and is also located in the coverage 1502 of the donor cell 1501. The user equipment 1902 performs transmission/reception with the relay node 1503.

The uplinks of the two user equipments 1901 and 1902 are studied. The user equipment 1901 communicates with the donor cell 1501 using an uplink 1903. The uplink 1903 is a direct link. The another user equipment 1902 communicates with the relay node 1503 using an uplink 1905. The uplink 1905 is an access link. In a case of using the first embodiment, the frequency band or the like is the same between the direct link and access link. Due to the communication between the user equipment 1901 and the donor cell 1501, uplink interference 1904 occurs for the relay node 1503 in some cases. Further, due to the communication between the another user equipment 1902 and the relay node 1503, uplink interference 1906 occurs for the donor cell 1501 in some cases. In FIG. 19, the interference is indicated by a broken line.

A solution in the first modification of the first embodiment is described below. The portion different from the solution of the first embodiment described above is mainly described here. The portion that is not descried here is similar to the first embodiment.

In the present modification, a different frequency band, different carrier, different component carrier or different frequency layer is used in the direct uplink and access uplink. This enables to divide the frequency of uplink (direct link) from a user equipment being served by a donor cell to the donor cell and the frequency of uplink (access link) from a user equipment being served by a relay node to the relay node. Accordingly, it is possible to reduce the uplink interference.

As a specific example, the frequencies of carriers to be used, specifically, the frequency bands, carriers, component carriers or frequency layers of a backhaul link and an access link are changed only in the uplink. Therefore, the configuration is made such that the frequency of a carrier to be used in the uplink differs between the direct uplink and access uplink, that is, a different frequency band, different carrier, different component carrier or different frequency layer is used therebetween. This enables to divide the frequency of uplink (direct link) from a user equipment being served by a donor cell to the donor cell and the frequency of uplink (access link) from a user equipment being served by a relay node to the relay node. Accordingly, it is possible to reduce the uplink interference.

Figure 20:
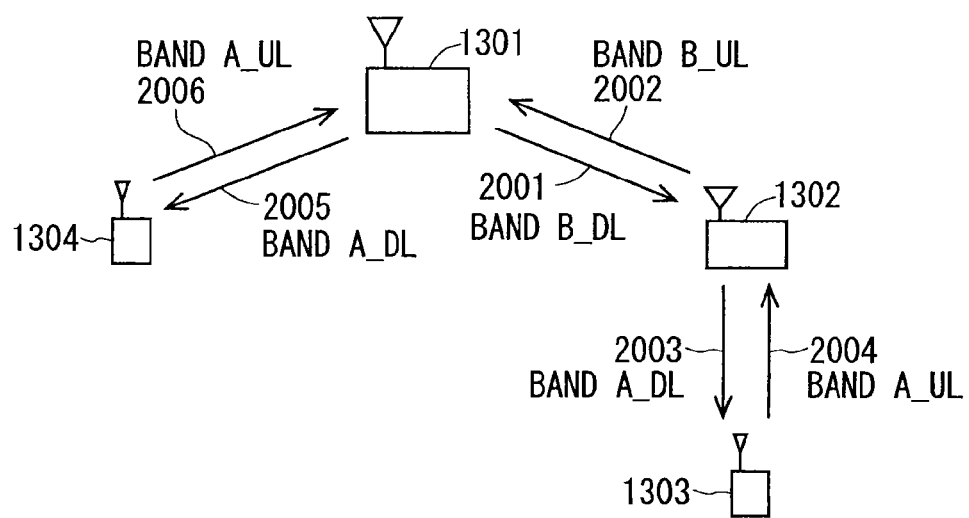
FIG. 20 is a diagram illustrating a relay node in a case where the solution of the first embodiment is used.

A specific example of the solution of the first modification of the first embodiment is described with reference to FIG. 20 and FIG. 21. The solution of the first embodiment is described again with reference to FIG. 20. FIG. 20 is a diagram illustrating a relay node in the case of using the solution of the first embodiment. The portions of FIG. 20 corresponding to those of FIG. 13 are denoted by the same reference numerals, which are not described. In a direct downlink 2005 being a downlink of direct links, for example, a frequency band A_DL is used. In a direct uplink 2006 being an uplink of the direct links, for example, a frequency band A_UL is used. In FIG. 20, the donor cell 1301 corresponds to a base station device, the relay node 1302 corresponds to a relay device, and the user equipments 1303 and 1304 correspond to user equipment devices. The mobile communication system includes the donor cell 1301, relay node 1302, and user equipments 1303 and 1304. The uplink corresponds to an uplink of radio communication, and the downlink corresponds to a downlink of radio communication.

In a backhaul downlink 2001 being a downlink of backhaul links, for example, a frequency band B_DL is used. In a backhaul uplink 2002 being an uplink of the backhaul links, for example, a frequency band B_UL is used. In an access downlink 2003 being a downlink of access links, for example, a frequency band A_DL is used. In an access uplink 2004 being an uplink of the access links, for example, a frequency band A_UL is used. Therefore, the configuration is made such that the access links 2003 and 2004 and the direct links 2005 and 2006 use the same frequency band A and only the backhaul links 2002 and 2001 use the different frequency band B.

Next, the solution of the first modification of the first embodiment is described with reference to FIG. 21. FIG. 21 is a diagram illustrating the relay node in a case of using the solution of the first modification of the first embodiment. The portions of FIG. 21 corresponding to those of FIG. 13 and FIG. 20 are denoted by the same reference numerals, which are not described. In the present modification, the frequency bands or the like of the backhaul link and access link are changed only in the uplink. In FIG. 21, the donor cell 1301 corresponds to a base station device, the relay node 1302 corresponds to a relay device, and the user equipments 1303 and 1304 correspond to user equipment devices.

That is, in a backhaul uplink 2101, for example, the frequency band B_UL used in the first embodiment is changed to the frequency band A_UL used in the access uplink 2004 in the first embodiment. In an access uplink 2102, for example, the frequency band A_UL used in the first embodiment is changed to the frequency band B_UL used in the backhaul uplink 2002 in the first embodiment. In the uplink 2006 from the user equipment 1304 being served by the donor cell 1301 to the donor cell 1301, for example, the frequency band A_UL is used as in the first embodiment.

This enables to divide the frequency of uplink 2006 from the user equipment 1304 being served by the donor cell 1301 to the donor cell 1301 and the frequency of uplink 2102 from the user equipment 1303 being served by the relay node 1302 to the relay node 1302. Accordingly, it is possible to reduce the uplink interference.

Meanwhile, the same frequency band or the like is used in the uplink 2006 from the user equipment 1304 being served by the donor cell 1301 to the donor cell 1301 and the uplink 2101 from the relay node 1302 to the donor cell 1301. The donor cell 1301 performs uplink scheduling for the user equipment 1304 and the relay node 1302. Therefore, it is possible to easily reduce the uplink interference due to scheduling, with a small control delay.

Put the solution in the first modification of the first embodiment another way, the downlinks 2001 and 2005 from the donor cell 1301 use a different frequency band or the like in the direct link 2005 and the backhaul link 2001. Meanwhile, in the uplinks 2006 and 2101 to the donor cell, the same frequency band or the like is allocated as the uplink frequency band for the direct link 2006 (also referred to as a pair band with the direct downlink 2005) and the uplink frequency band for the backhaul link 2101. That is, in the present modification, the donor cell 1301 allocates different frequency bands to the direct downlink 2005 and the backhaul downlink 2001 and allocates the same frequency band to the pair band with the direct downlink 2005 and the pair band with the backhaul downlink 2001.

The method of enabling the automatic operation of a network in the first modification of the first embodiment is disclosed below. A donor cell notifies the frequency information for a relay node. The donor cell may notify the frequency information for a relay node using a direct link, using a backhaul link, or using both of them. The notification of the frequency information for a relay node using a direct link allows a relay node to obtain the frequency information for a relay node even in a case where the relay node camps on the direct link in, for example, installation. The notification of the frequency information for a relay node using a backhaul link allows a relay node to obtain the frequency information for a relay node even in a case where the relay node camps on the backhaul link in, for example, installation.

Four specific examples of the frequency information for a relay node in a case where notification is made using a direct link are disclosed below.

(1) A frequency band, carrier or component carrier can be used in a backhaul downlink. Alternatively, it may be a frequency band, carrier or component carrier that is not used in a direct downlink.

(2) A frequency band, carrier or component carrier can be used in an access downlink. It may be a frequency band, carrier or component carrier used in a direct downlink. Alternatively, for example, by setting that the carrier having the same frequency as that of the direct downlink may be used in the access downlink, the information may be omitted. Accordingly, an effect that radio resources are effectively used is achieved.

(3) A frequency band, carrier or component carrier can be used in an access uplink. Alternatively, for example, by setting that the carrier having the different frequency from that of the direct uplink may be used in the access uplink, the information may be omitted. Accordingly, an effect that radio resources are effectively used is achieved.

(4) (1), (2) and (3) described above may be combined and notified.

Four specific examples of the frequency information for a relay node in a case where notification is made using a backhaul link are disclosed below.

(1) Notification that the link is backhaul. Alternatively, notification that priority is given to backhaul in the link. The notification allows a user equipment being served by a donor cell to reselect another cell even in a case where the user equipment selects a backhaul link as the best cell in cell selection, cell reselection, handover or the like.

(2) A frequency band, carrier or component carrier can be used in an access downlink. Alternatively, it may be a frequency band, carrier or component carrier used in the direct downlink.

(3) A frequency band, carrier or component carrier can be used in an access uplink. Alternatively, it may be a frequency band, carrier or component carrier used in the direct uplink. Still alternatively, for example, by setting that the carrier having the different frequency from that of the backhaul uplink may be used in the access uplink, the information may be omitted. Accordingly, an effect that radio resources are effectively used is achieved.

(4) (1), (2) and (3) described above may be combined and notified.

Two specific examples of the method of notifying the frequency information for a relay node from a donor cell to a relay node are disclosed below. (1) Notification is made as the broadcast information. (2) Notification is made as dedicated control information. In a case where notification is made as the dedicated control information, the donor cell and relay node perform, for example, RRC connection. The RRC connection may be performed upon a request from a relay node. The relay node may notify the donor cell of "indication of a relay node" using the RRC connection. After the notification, the donor cell may notify the relay node of the frequency information for a relay node.

Next, the sequence example of a mobile communication system in the case of using the solution of the first modification of the first embodiment is described with reference to FIG. 21 and FIG. 22. FIG. 21 has been described above, which is not described here. FIG. 22 is a diagram illustrating a sequence example of a mobile communication system in a case of using the solution of the first modification of the first embodiment and also in a case where the relay node performs cell selection to the direct link (band A_DL in the example of FIG. 21) in, for example, installation.

In Step ST2200, the relay node 1302 performs cell selection to the direct downlink 2005 of the donor cell 1301. That is, the relay node 1302 camps on the direct link. In Step ST2201, the donor cell 1301 notifies the relay node 1302 being served thereby, using the direct downlink 2005, of the frequency band can be used in the backhaul downlink 2001, the frequency band can be used in the access downlink 2003, and the frequency band can be used in the access uplink 2102.

In Step ST2202, the relay node 1302 sets the frequency band of the backhaul downlink 2001 as the frequency band can be used in the backhaul downlink 2001 that has been received in Step ST2201. In a case where a plurality of frequency bands have been received in Step ST2201, the relay node 1302 selects one from the plurality of frequency bands and sets the selected one.

In Step ST2203, the relay node 1302 selects the same frequency band as that of the direct uplink 2006 being a pair band with the direct downlink 2005 and set as the frequency band of the backhaul uplink 2101.

In Step ST2204, the relay node 1302 sets the frequency band of the access downlink 2003 as the frequency band can be used in the access downlink 2003 that has been received in Step ST2201. In a case where a plurality of frequency bands have been received in Step ST2201, the relay node 1302 selects one from the plurality of frequency bands and sets the selected one.

In Step ST2205, the relay node 1302 sets the frequency band of the access uplink 2102 as the frequency band can be used in the access uplink 2102 that has been received in Step ST2201. In a case where a plurality of frequency bands have been received in Step ST2201, the relay node 1302 selects one from the plurality of frequency bands and sets the selected one.

In Step ST2206, the relay node 1302 re-camps on the backhaul link (performs cell reselection) using the frequency band can be used in the backhaul downlink that has been received in Step ST2201.

In the present modification, the donor cell notifies the relay node of, for example, the frequency different from that of the carrier used in the backhaul downlink 2001 and same as that of the carrier used in the direct downlink 2005 as the frequency information of the carrier used in the access downlink 2003. Further, the donor cell notifies the relay node of, for example, the frequency different from that of the carrier used in the backhaul uplink 2101 and also different from that of the carrier used in the direct uplink 2006 as the frequency information of the carrier used in the access uplink 2102. The relay node sets the frequencies of the carriers used in the uplink and downlink of the access link based on the frequency information notified from the donor cell.

The first modification of the first embodiment achieves an effect below in addition to the effects of the first embodiment. It is possible to divide the frequency of uplink from a user equipment being served by a donor cell to the donor cell and the frequency of uplink from a user equipment being served by a relay node to the relay node. Accordingly, it is possible to reduce the uplink interference.

Second Embodiment

A second embodiment of the present invention discloses a solution different from that of the first embodiment for the problem of the present invention. The solution in the second embodiment is disclosed below. The donor cell notifies a user equipment being served thereby of the information of the access link used in a relay node being served thereby. The user equipment that has received the information performs a search operation using the carrier used in the access link.

Alternatively, the relay node may notify a user equipment being served thereby of the information of the direct link used in the donor cell. The user equipment that has received the information performs a search operation using the carrier used in the direct link.

As a result, the user equipment can ascertain the carrier frequency that is used in the access link by the relay node. Therefore, it is possible to reduce the load of a user equipment in a search operation.

Specific examples of the information of the access link include the frequencies of carriers to be used, more specifically, the frequency bands, carriers, component carriers and frequency layers. As a specific example of the notification method, notification is made as the broadcast information. This enables to notify a user equipment being served thereby without using a dedicated channel. Accordingly, radio resources can be effectively used. Further, notification can be made irrespective of the state (connected state, idle state) of a user equipment being served thereby.

Three specific examples of the broadcast information are disclosed below.

(1) Mapping is performed to an SIB3. The information common to intra-frequency cell reselection, inter-frequency cell reselection and inter-system cell reselection is mapped to the SIB3 (see Non-Patent Document 9). Accordingly, through mapping of the "information of access link" to the SIB3, a user equipment is allowed to receive the "information of access link" being the information related to the cell reselection together with the conventional "information common to cell reselection". This reduces the load of the processing in cell reselection by a user equipment and also reduces a control delay.

(2) Mapping is performed to an SIB5. The information related to inter-frequency cell reselection is mapped to the SIB5 (see Non-Patent Document 9). Accordingly, through mapping of the "information of access link" to the SIB5, a user equipment is allowed to receive the "information of access link" being the information related to the inter-frequency cell reselection together with the conventional "information related to the inter-frequency cell reselection". This reduces the load of the processing in inter-frequency cell reselection by a user equipment and also reduces a control delay.

(3) Mapping is performed to neighboring cell setting. The neighboring cell setting is also referred to as "neighCellConfig" (see Non-Patent Document 9). Accordingly, through mapping of the "information of access link" to the neighboring cell setting, a user equipment is allowed to receive the "information of access link" being the information related to a neighboring cell of a serving cell (donor cell) together with the conventional "neighboring cell setting". This reduces the load of the processing for receiving the neighboring cell information by a user equipment and also reduces a control delay.

Figure 23:
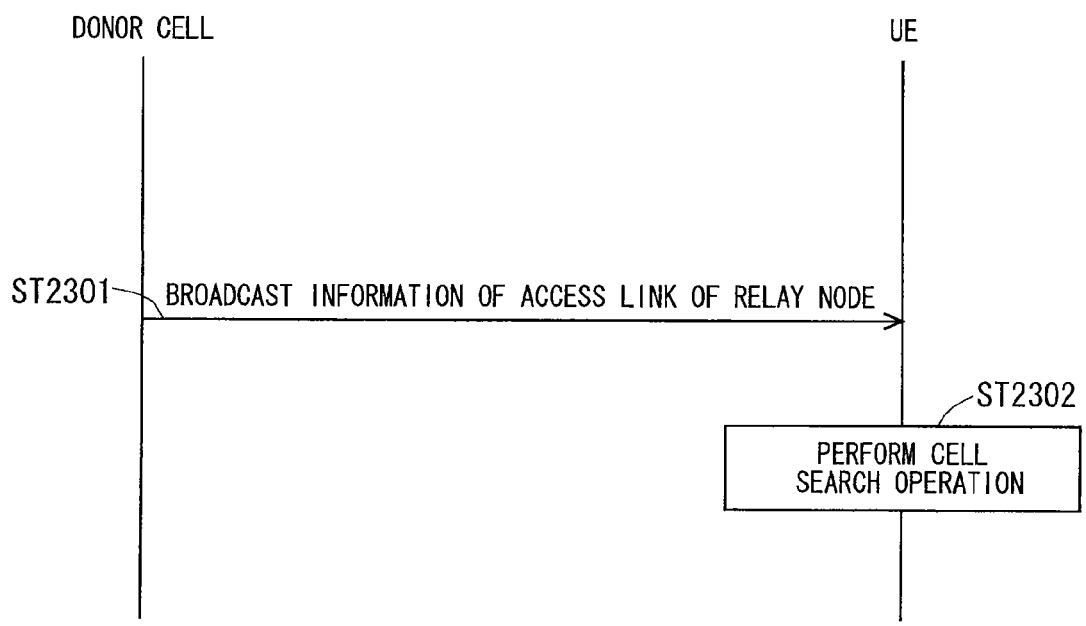
FIG. 23 is a diagram illustrating a sequence example of a mobile communication system in a case where a solution of a second embodiment is used.

A specific operation example using the second embodiment is described with reference to part (b) of FIG. 14 described above and FIG. 23. Part (b) of FIG. 14 has been described above, which is not described here. FIG. 23 is a diagram illustrating a sequence example of a mobile communication system in a case of using a solution of the second embodiment. In Step ST2301, the donor cell 1301 broadcasts the information of the access link of the relay node 1302 to user equipments including the user equipment 1304 being served thereby. For example, in part (b) of FIG. 14, the donor cell 1301 broadcasts the band B as the information of the access link of the relay node 1302 to user equipments including the user equipment 1304 being served thereby.

In Step ST2302, the user equipment 1304 performs the cell search operation using the information of the access link that has been received in Step ST2301.

The second embodiment achieves an effect below. A user equipment can ascertain, for example, the carrier frequency used in the access link by the relay node. This simplifies the search operation of a user equipment. Therefore, the load of a user equipment can be reduced, which contributes to lower power consumption.

Third Embodiment

A problem to be solved by a third embodiment is described below. In a case where a HeNB is installed in the coverage of a cell or in the vicinity thereof, interference occurs in the uplink, similarly to a donor cell and a relay node.

A solution of the third embodiment is described below. A HeNB uses a carrier of a frequency different from that of a carrier used in the uplink of a neighboring cell in the uplink. Specifically, a HeNB uses a frequency band, carrier, component carrier or frequency layer, which is different from a frequency band, carrier, component carrier or frequency layer used in the uplink of a neighboring cell, in an uplink. This enables to divide the frequency of uplink from a user equipment being served by a neighboring cell to the neighboring cell and the frequency of uplink from a user equipment being served by a HeNB to the HeNB. Accordingly, it is possible to reduce the uplink interference.

Alternatively, a HeNB may use the same frequency band, carrier, component carrier or frequency layer as a frequency band, carrier, component carrier or frequency layer used in the downlink of a neighboring cell. This makes the downlink of a neighboring cell and the downlink of a HeNB have the same carrier or the like, which simplifies the search operation of a user equipment. Accordingly, it is possible to reduce the load of a user equipment, which contributes to lower power consumption.

Figure 24:
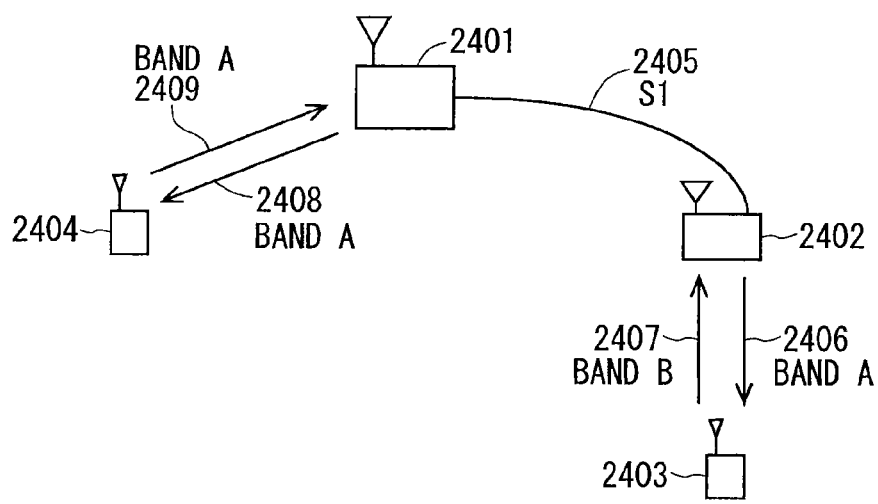
FIG. 24 is a diagram illustrating a HeNB in a case where a solution of a third embodiment is used.

A specific example of the solution of the third embodiment is described with reference to FIG. 24. FIG. 24 is a diagram illustrating a HeNB in a case of using the solution of the third embodiment. A neighboring cell, for example, a macro cell 2401 is connected to a HeNB 2402 by means of an S1 interface 2405. The neighboring cell 2401 has a user equipment 2404 served thereby. The neighboring cell 2401 is connected to a user equipment 2404 via a downlink 2408 and an uplink 2409. For example, the frequency band A is used in the downlink 2408 and the frequency band A is used in the uplink 2409.

In FIG. 24, the macro cell 2401 and the HeNB 2402 correspond to base station devices, and user equipments 2403 and 2404 correspond to user equipment devices. The mobile communication system includes the macro cell 2401, HeNB 2402 and user equipments 2403 and 2404.

The HeNB 2402 has the user equipment 2403 being served thereby. The HeNB 2402 is connected to the user equipment 2403 via a downlink 2406 and an uplink 2407. In the uplink 2407, a carrier of a frequency different from that of the uplink 2409 of the neighboring cell 2401 is selected as a carrier to be used and set. Specifically, for example, a frequency band different from that of the uplink 2409 of the neighboring cell 2401 is selected and set. In FIG. 24, for example, the frequency band B is used in the uplink 2407.

In the downlink 2406, a carrier having the same frequency as that of the downlink 2408 of the neighboring cell 2401 is selected as a carrier to be used, and then is set. Specifically, for example, the same frequency band as that of the downlink 2408 of the neighboring cell 2401 is selected and set. In FIG. 24, for example, the frequency band A is used in the downlink 2406.

This enables to divide the frequency of uplink 2409 from the user equipment 2404 being served by the neighboring cell 2401 to the neighboring cell 2401 and the frequency of uplink 2407 from the user equipment 2403 being served by the HeNB 2402 to the HeNB 2402.

Two specific examples of the method of allowing a HeNB to ascertain the frequency information of the neighboring cell are disclosed below.

(A1) A neighboring cell notifies a neighboring node of the frequency information of own cell using the S1 interface 2405.

(A2) A HeNB measures a surrounding radio environment in initialization, turning-on of power or turning-off of transmission at times. Specific examples of the surrounding radio environment include the measurement results of neighboring cells. In measuring neighboring cells, a HeNB stores the frequency information used in the downlink of the neighboring cell. In addition, a HeNB receives the broadcast information of the neighboring cell, decodes the broadcast information, ascertains the frequency information used in the uplink of a neighboring cell that is included in the broadcast information, and stores the frequency information used in the uplink of the neighboring cell.

Specific examples of the frequency information include the frequency information used in the uplink and the frequency information used in the downlink, and further include a frequency band, carrier, component carrier and frequency layer. It is conceivable that specific examples of the frequency information used in the uplink in LTE and LTE-A may include a carrier frequency (ul-CarrierFreq) and an uplink bandwidth (ul-bandwidth).

Disclosed below is one specific example of the method of determining, by a serving cell, a neighboring node that is notified of the frequency information of own cell in a case where the specific example described in (A1) above is used in the specific example of the method of allowing a HeNB to ascertain the frequency information of the neighboring cell. One or a plurality of nodes may be notified of the frequency information of own cell. The selection of a node that is notified of the frequency information of own cell by a method described below enables to select a neighboring node. This eliminates the need to notify also an unnecessary node of the frequency information of own cell, whereby the load of the processing by a serving cell is reduced.

(B) 3GPP is currently discussing that in a case where a HeNB is installed, the network is notified of the location information of the HeNB. A serving cell determines a neighboring node that is notified of the frequency information of own cell based on the location of the own cell and the location information of the HeNB. As a specific example, a serving cell obtains the distance between own cell and the HeNB from the locations thereof. If the distance is equal to or larger than a certain threshold (or is larger than a threshold), a serving cell selects that node as the node that is notified of the frequency information of own cell.

Disclosed below is a specific example of the method of determining, by a HeNB, a neighboring cell that stores the frequency information broadcast information used in a downlink and a neighboring cell that decodes the broadcast information and stores the frequency information used in an uplink in a case where the specific example described in (A2) above is used in the specific example of allowing the HeNB to ascertain the frequency information of the neighboring cell.

Based on the measurement results of a surrounding radio environment of the HeNB, the HeNB determines a neighboring cell that stores the frequency information broadcast information used in a downlink, decodes the broadcast information and stores the frequency information used in an uplink. Specific examples of the surrounding radio environment include the measurement results of a neighboring cell. Specific examples of the measurement results of a neighboring cell include the reception quality, received power and path loss.

If the reception quality or received power of a certain node is equal to or larger than a certain threshold (or is larger than a threshold) in the measurement results of a surrounding radio environment, a HeNB selects that cell as the neighboring cell that stores the frequency information broadcast information used in a downlink, receives the broadcast information, decodes the broadcast information and stores the frequency information used in an uplink. Alternatively, if the path loss of a certain node is smaller (or is equal to or smaller) than a certain threshold in the measurement results of a surrounding radio environment, a HeNB selects that cell as the neighboring cell that stores the frequency information broadcast information used in the downlink, receives the broadcast information, decodes the broadcast information, and stores the frequency information used in an uplink.

One or a plurality of neighboring cells may receive the broadcast information, decode the broadcast information and store the frequency information. The selection of a neighboring cell that receives the broadcast information, decodes the broadcast information and stores the frequency information enables to select a neighboring cell. This eliminates the need to receive the broadcast information, decode the broadcast information and store the frequency information wastefully by a neighboring cell, which reduces the load of the processing of a HeNB.

Disclosed below is a specific example of the method of selecting the frequency information used in a downlink in a case where a plurality of neighboring cells receive the broadcast information, decode the broadcast information and store the frequency information or in a case where a plurality of neighboring cells have notified the frequency information, as a result of the measurement results of a surrounding radio environment of a HeNB.

In the case where a plurality of neighboring cells receive the broadcast information, decode the broadcast information and store the frequency information, a HeNB determines the frequency information used in a downlink based on the measurement results of the surrounding radio environment of a HeNB. Specific examples of the surrounding radio environment include the measurement results of a neighboring cell. Specific examples of the measurement results of a neighboring cell include the reception quality, received power and path loss.

In the measurement results of a surrounding radio environment, a HeNB uses the same frequency band, carrier, component carrier or frequency layer as the frequency band, carrier, component carrier or frequency layer used in a downlink of the cell having the best reception quality, the cell having the largest received power, or the cell having the smallest path loss.

This enables to make the frequency information identical to that of the downlink of a neighboring cell which is considered to be located in the closest vicinity thereof. That is, it is possible to make the frequency information identical to that of the downlink of a neighboring cell that has a user equipment being served thereby, the user equipment being highly expected to reselect own HeNB cell. In addition, it is possible to make the frequency information identical to that of the downlink of a neighboring cell highly expected to be selected as a cell reselection destination by a user equipment being served by own HeNB cell. Therefore, it is the most effective cell selection method from the viewpoint of a load reduction of a user equipment in a sell reselection operation.

Disclosed below are two specific examples of the method of selecting the frequency information used in an uplink in a case where a plurality of neighboring cells receive the broadcast information, decode the broadcast information and store the frequency information or in a case where a plurality of neighboring cells have notified the frequency information, as a result of the measurement results of a surrounding radio environment of a HeNB. In the case where a plurality of neighboring cells receive the broadcast information, decode the broadcast information and store the frequency information, a HeNB determines the frequency information used in an uplink based on the measurement results of a surrounding radio environment of a HeNB. Specific examples of the surrounding radio environment include the measurement results of a neighboring cell.

Specific examples of the measurement results of a neighboring cell include the reception quality, received power and path loss.

(1) In the measurement results of a surrounding radio environment, a HeNB uses a frequency band, carrier, component carrier or frequency layer different from the frequency band, carrier, component carrier or frequency layer used in an uplink of the cell having the best reception quality, the cell having the largest received power or the cell having the smallest path loss. This enables to make the frequency information different from that of the uplink of a neighboring cell which is considered to be located in the closest vicinity thereof. Therefore, it is the most effective cell selection method from the viewpoint of a reduction of uplink interference.

(2) A HeNB uses a frequency band, carrier, component carrier or frequency layer different from the frequency bands, carriers, component carriers or frequency layers used in the uplink of all neighboring cells. It is possible to make the frequency information different from that of the uplinks of a large number of neighboring cells. Accordingly, it is possible to reduce the uplink interference between a large number of cells.

Figure 25:
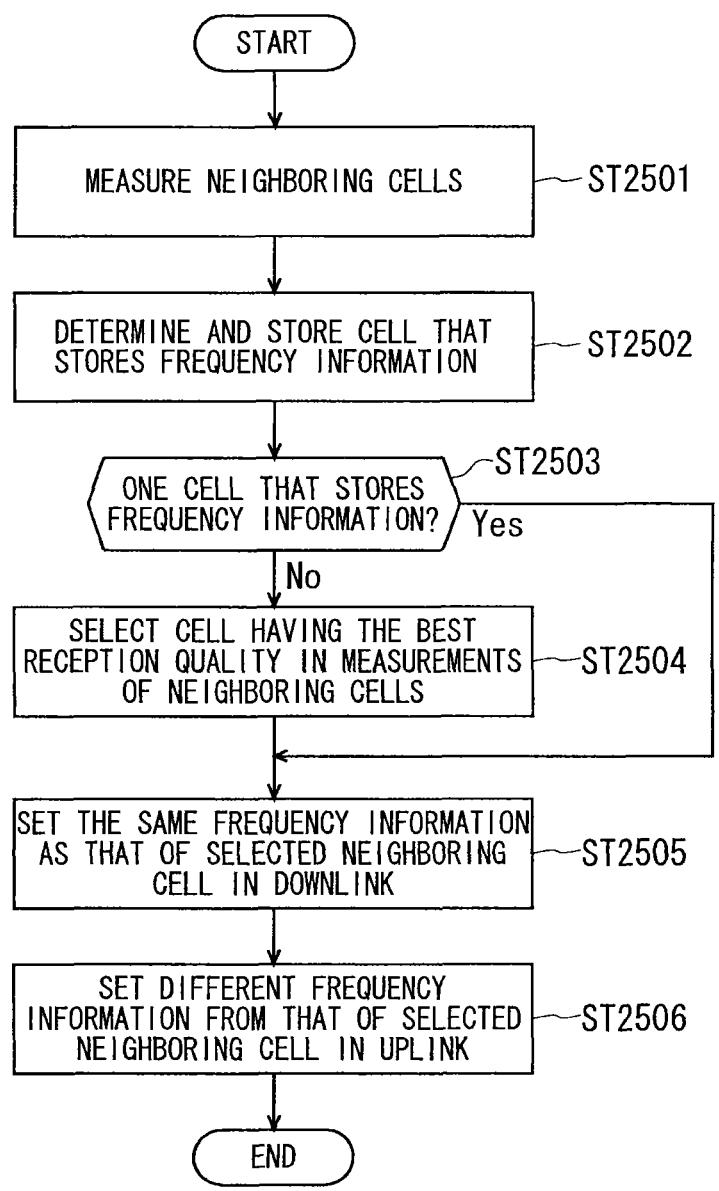
FIG. 25 is a flowchart showing a procedure of an operation example of setting the frequency information of a HeNB in a case where the third embodiment is used.

A specific operation example using the third embodiment is described with reference to FIG. 24 and FIG. 25. FIG. 24 has been described above, which is not described here. Next, an example of the operation of setting the frequency information of a HeNB in a case where the third embodiment is used is described with reference to FIG. 25. FIG. 25 is a flowchart showing the procedure of the example of the operation of setting the frequency information of a HeNB in the case of using the third embodiment. The case where the above-mentioned specific example of the method (A2) of allowing a HeNB to ascertain the frequency information of a neighboring cell is disclosed in the operation example of the flowchart shown in FIG. 25.

In Step ST2501, the HeNB 2402 measures neighboring cells. In Step ST2502, the HeNB 2402 determines and stores the cell that stores the frequency information. In Step ST2503, the HeNB 2402 judges whether or not one cell stores the frequency information. In a case of one, the HeNB 2402 moves to Step ST2505 or moves to Step ST2504 in a case of other than one.

In Step ST2504, the HeNB 2402 selects the cell that has the best reception quality in the measurements of neighboring cells performed in Step ST2501. In the example of FIG. 24, the neighboring cell 2401 is selected.

In Step ST2505, the HeNB 2402 sets the same frequency information as that of the neighboring cell selected in Step ST2504 in the downlink to a user equipment being served thereby. In the example of FIG. 24, the HeNB 2402 sets the frequency band A, which is the same frequency information as that of the downlink 2408 of the neighboring cell 2401 selected in Step ST2504, in the downlink 2406 to the user equipment 2403 being served thereby.

In Step ST2506, the HeNB 2402 sets the frequency information different from that of the neighboring cell selected in Step ST 2504 in the uplink from a user equipment being served thereby. In the example of FIG. 24, the HeNB 2402 sets the frequency band B, which is the different frequency information from that of the uplink 2409 of the neighboring cell 2401 selected in Step ST2504, in the uplink 2407 from the user equipment 2403 being served thereby.

The third embodiment achieves the effects below. The frequency of a carrier to be used, specifically, frequency band, carrier, component carrier or frequency layer is the same between the downlink of a neighboring cell and the downlink of a HeNB, and accordingly the search operation of a user equipment is simplified. This reduces the load of a user equipment, which contributes to lower power consumption.

The frequency of a carrier to be used, specifically, a frequency band, carrier, component carrier or frequency layer differs between the uplink of a neighboring cell and the uplink of a HeNB, which enables to divide the frequencies. This reduces the uplink interference. Accordingly, the present embodiment enables to prevent the interference in a mobile communication system and reduce the load of a user equipment in a search operation.

While the invention has been shown and described in detail, the foregoing description is in all aspects illustrative and not restrictive. It is therefore understood that numerous modifications and variations can be devised without departing from the scope of the invention.

DESCRIPTION OF REFERENCE SYMBOLS 1301 donor cell (Donor eNB, DeNB), 1302 relay node, 1303, 1304, 2403, 2404 user equipment, 1305 backhaul link, 1306 access link, 1307 direct link, 2001 backhaul downlink, 2002, 2101 backhaul uplink, 2003 access downlink, 2004, 2102 access uplink, 2005 direct downlink, 2006 direct uplink, 2401 macro cell, 2402 HeNB, 2406, 2408 downlink, 2407, 2409 uplink.

The invention claimed is:

1. A mobile communication system comprising:
a base station device;
first and second user equipment devices configured to perform radio communication with said base station device;
a relay device relaying the radio communication between said base station device and said first user equipment device;
said relay device is further configured to perform radio communication with said first user equipment device using a carrier having a different frequency from a frequency of a carrier used by the relay device in radio communication with said base station device; and
said base station device is further configured to perform downlink radio communication with said second user equipment device using the same carrier having the same frequency as used in an uplink radio communication from said first user equipment device to said relay device.

2. A mobile communication system comprising: a base station device; a user equipment device configured to perform radio communication with said base station device; a relay device relaying the radio communication between said base station device and said user equipment device; said relay device performs radio communication with said user equipment device using a carrier having a different frequency from a frequency of a carrier used by the relay device in radio communication with said base station device; and said base station device notifies said user equipment device of information related to a radio communication link in the mobile communication system, and said user equipment searches for the relay station based on the notified information when the user equipment makes a determination about whether to communicate with the base station device or the relay device, the notified information including (a) information indicating that the radio communication link selected by said user equipment device is a backhaul link, (b) information of a frequency band, carrier, or component carrier used in a direct link between the base station device and the user equipment, and (c) information of a frequency band, carrier, or component carrier used in an access link between the relay device and the user equipment.

3. A mobile communication system comprising:
a plurality of base station devices;
first and second user equipment devices configured to perform radio communication with said base station devices;
each of said base station devices performs, in a downlink of radio communication to said second user equipment device, radio communication using a carrier having the same frequency as that of a carrier used in a downlink of radio communication from another base station device to said second user equipment device;
each of said base station devices performs, in an uplink of radio communication from said second user equipment device, radio communication using a carrier having a different frequency from that of a carrier used in an uplink of radio communication from said second user equipment device to said another base station device; and
a first base station device, in said base station devices, includes a direct communication link to a second base station device in said base station devices, and the first base station device selects the second base station device in said base station devices based on a location of the first base station device, a location of the selected second base station device, and measurement result of a surrounding radio environment of the first base station device, and notifies the second base station device, via the direct communication link, of frequency information of the first base station device.

* * * * *